United States Patent
Lewinson et al.

(10) Patent No.: US 11,677,878 B2
(45) Date of Patent: Jun. 13, 2023

(54) METHODS AND SYSTEMS FOR NOTIFICATIONS IN COMMUNICATIONS NETWORKS

(71) Applicant: RIDESHARK CORPORATION, Ottawa (CA)

(72) Inventors: Tom Henrik Lewinson, Ottawa (CA); Sharon Elizabeth Lewinson, Ottawa (CA)

(73) Assignee: RideShark Corporation, Ottawa (CA)

( * ) Notice: Subject to any disclaimer, the term of this patent is extended or adjusted under 35 U.S.C. 154(b) by 297 days.

(21) Appl. No.: 16/992,313

(22) Filed: Aug. 13, 2020

(65) Prior Publication Data
US 2020/0374403 A1 Nov. 26, 2020

Related U.S. Application Data

(62) Division of application No. 15/521,982, filed as application No. PCT/CA2015/000552 on Oct. 27, 2015, now abandoned.
(Continued)

(51) Int. Cl.
*H04M 3/533* (2006.01)
*H04L 51/23* (2022.01)
(Continued)

(52) U.S. Cl.
CPC ........ *H04M 3/53341* (2013.01); *H04L 51/02* (2013.01); *H04L 51/23* (2022.05);
(Continued)

(58) Field of Classification Search
CPC ......... H04L 51/02; H04L 51/23; H04L 51/56; H04L 51/18; H04M 3/53341; H04W 4/14
See application file for complete search history.

(56) References Cited

U.S. PATENT DOCUMENTS 6,202,096 B1 * 3/2001 Williams .............. H04L 69/329
709/227
7,027,567 B1 * 4/2006 Scott ................. H04M 3/53366
455/412.2
(Continued)

FOREIGN PATENT DOCUMENTS

WO WO-2013037007 A1 * 3/2013 ............... G06F 3/16

*Primary Examiner* — Mehmood B. Khan
(74) *Attorney, Agent, or Firm* — Rosenberg, Klein & Lee

(57) ABSTRACT

Communications is the exchange of thoughts, messages, or information. However, whilst immense investments into evolving communications infrastructure supporting multiple communications channels have been made the vast majority of communications models, standards, and developments focus to the transmission of the message as a single process with other aspects of the communications channel are considered simply delays in the communications channel. However, it would be beneficial to provide enhancements to such communications channels to provide a sender with additional options with respect to the delivery to and recovery by the recipient of the message such that not only do they have the option to elect to receive a delivery notification in communications systems that today do not provide such information, but that in these systems and those supporting delivery notifications increased information is provided to the user allowing them to ascertain or estimate the recipient's absorption/reading of the message whilst also allowing the recipient to quickly and simply reply and/or acknowledge the message.

14 Claims, 23 Drawing Sheets

Related U.S. Application Data

(60) Provisional application No. 62/068,866, filed on Oct. 27, 2014.

(51) Int. Cl.
    *H04L 51/56*         (2022.01)
    *H04L 51/02*         (2022.01)
    *H04W 4/14*         (2009.01)
    *H04L 51/18*         (2022.01)

(52) U.S. Cl.
    CPC ............... *H04L 51/56* (2022.05); *H04W 4/14* (2013.01); *H04L 51/18* (2013.01)

(56) References Cited

U.S. PATENT DOCUMENTS

| | | | | |
|---|---|---|---|---|
| 7,761,521 | B2 * | 7/2010 | Kubala | G06Q 10/107 709/206 |
| 7,809,794 | B2 * | 10/2010 | Fellenstein | H04L 51/224 709/205 |
| 7,984,104 | B1 * | 7/2011 | Stark | G06F 40/143 709/225 |
| 8,990,312 | B2 * | 3/2015 | Wilson | H04L 51/212 709/206 |
| 2002/0169841 | A1 * | 11/2002 | Carlson | G06Q 10/107 709/206 |
| 2003/0233420 | A1 * | 12/2003 | Stark | G06F 21/6209 709/206 |
| 2004/0006598 | A1 * | 1/2004 | Bargagli Damm | G06Q 30/02 709/206 |
| 2004/0030917 | A1 * | 2/2004 | Karamchedu | H04L 51/224 726/3 |
| 2004/0111477 | A1 * | 6/2004 | Boss | H04W 4/029 709/206 |
| 2004/0249890 | A1 * | 12/2004 | Fellenstein | H04L 51/224 709/217 |
| 2006/0218232 | A1 * | 9/2006 | Kubala | G06Q 10/107 709/224 |
| 2007/0168301 | A1 * | 7/2007 | Eisner | H04L 63/0209 705/79 |
| 2007/0274465 | A1 * | 11/2007 | Othmer | H04M 3/53 379/67.1 |
| 2008/0034424 | A1 * | 2/2008 | Overcash | H04L 63/1416 726/22 |
| 2008/0088428 | A1 * | 4/2008 | Pitre | G08B 25/016 340/506 |
| 2008/0147813 | A1 * | 6/2008 | Damm | G06Q 10/107 709/206 |
| 2013/0007144 | A1 * | 1/2013 | Ahern | G06Q 10/107 709/206 |
| 2013/0091066 | A1 * | 4/2013 | Zeng | G06Q 30/0201 705/317 |
| 2013/0194301 | A1 * | 8/2013 | Robbins | G06F 21/60 345/629 |
| 2015/0324390 | A1 * | 11/2015 | Macciola | H04N 1/387 707/769 |
| 2017/0330153 | A1 * | 11/2017 | Muhammedali | G06Q 10/06 |
| 2017/0339277 | A1 * | 11/2017 | Lewinson | H04L 51/56 |

\* cited by examiner

METHODS AND SYSTEMS FOR NOTIFICATIONS IN COMMUNICATIONS NETWORKS

CROSS-REFERENCE TO RELATED APPLICATIONS

This application claims the benefit of priority as a divisional patent application of U.S. Ser. No. 15/521,982 entitled "Methods and Systems for Notifications in Communications Networks" filed Apr. 26, 2017; which itself claims the benefit of priority as a 371 National Phase entry application of PCT/CA2015/000,552 entitled "Methods and Systems for Notifications in Communications Networks" filed Oct. 27, 2015; which itself claims the benefit of priority from U.S. Provisional Patent Application 62/068,866 entitled "Methods and Systems for Notifications in Communications Networks" filed Oct. 27, 2014; the entire contents of each being incorporated herein by reference.

FIELD OF THE INVENTION

The present invention relates to communications systems and more particularly delayed notifications and enhanced sender feedback.

BACKGROUND OF THE INVENTION

Communication is the exchange of thoughts, messages, or information, as by speech, visuals, signals, writing, or behavior. As such communication requires a sender, a message, and a recipient, although the receiver does need not be present or aware of the sender's intent to communicate at the time of communication and therefore communication can occur across wide ranges of distances in both time and space. Typically, communication requires that the communicating parties share an area of communicative commonality and a communication process is typically considered complete once the receiver has understood the message of the sender.

Within the prior art models allowing one-way, two-way, and multi-way conversations have been established, analysed and implemented within telecommunications infrastructure across multiple communications technologies to perform the transmitter, channel, and receiver such as wireless, wired, and fiber optic. Such models support multiple communication formats including, for example, voice, either through Plain Old Telephone Service (POTS) or Voice-over-Internet Protocol (VOIP), as a general two-way communication process, electronic mail, commonly referred to as email and generalized into one-way communications, and Short Message Service, commonly referred to as SMS or text and similarly generalized into a one-way communication. Accordingly, communications common today such as "Tweeting" on the social media network Twitter™ and concepts such as "email threads" and Instant Messaging are merely concatenations of multiple discrete email and SMS one-way communications. "Tweeting" and email provide multicast communications wherein the message is communicated to a plurality of recipients simultaneously in a single transmission from the source wherein copies of the message are automatically created in other network elements, such as routers, but only when the topology of the network requires it.

However, these models and the consideration of the interactions between sender and recipient is that the message is sent by the sender and received by the recipient as a single process and that other aspects of the communications channel such as voicemail, email server, and text server that store the senders message prior to the recipients receipt are modeled as a delay within the communications channel. However, going back to the primary definition of communication is the exchange of thoughts, messages, or information and accordingly these models and their physical implementations do not provide for verification that the exchange has occurred in the manner the sender intended unless for example the voice communication is a two-way session or a subsequent one-way communication from the recipient referencing the original one-way communication or its content is received by the sender.

Voicemail broke the two-way communication session methodology of telephony prior to its introduction today compounded by different modes of voicemail operation, including telephone answering, voice messaging, and speech-to-text. Accordingly, the sender is unable to determine whether the recipient has listened to the message, deleted it unheard, or stopped listening part way through the voicemail. With the rapid uptake of portable electronic devices (PEDs) many individuals now have three or more telephone numbers, for example home, cellphone, and work, thereby increasing the complexity of ensuring a message is delivered to a recipient, yet alone played and understood. These issues have continued into email and SMS/text communications in the last thirty years as these systems have proliferated. With the adoption of email into business activities and its replacement of physical mail delivery which provided options for delivery verification such as from the mail delivery organization itself or through a signature of the recipient the absence of verification has continued to present issues.

Accordingly it would be beneficial to provide enhancements to voicemail, email, SMS and other communications that provide additional information to the sender with respect to the delivery to and recovery by the recipient of the message such that not only do they have the option to elect to receive a delivery notification in communications systems that today do not provide such information, but that in these systems and those supporting delivery notifications increased information is provided to the user allowing them to ascertain or estimate the recipient's absorption/reading of the message. It would be further beneficial for a sender to be able to easily establish and provide options for a recipient to rapidly provide responses and/or information. It would be further beneficial for such enhancements to be presented to the user through an intuitive user interface.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations in the prior art relating to communications systems and more particularly delayed notifications and enhanced sender feedback.

In accordance with an embodiment of the invention there is provided a method of providing a recipient at a predetermined time at least one of an electronic message and a voicemail message from a sender with a series of options, each option of the series of options comprising a single button to be selected by the recipient to provide a predetermined response to the message sender wherein each option and its predetermined response are provided to the recipient as part of the sender message.

In accordance with an embodiment of the invention there is provided a method of providing a recipient at a predetermined time at least one of an electronic message and a voicemail message from a sender with a series of options, each option of the series of options comprising an icon to be selected by the recipient to provide a predetermined response to the message sender wherein each option and its predetermined response are provided to the recipient as part of the sender message and upon selection trigger a message to a predetermined uniform resource locator.

In accordance with an embodiment of the invention there is provided a method of automatically providing to a recipient at a predetermined time after delivery of an initial message from a sender a prompt message, the prompt message being at least one of an electronic message and a voicemail message with a series of options and transmitted to the user via a different communications channel to that employed for the initial message.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1:
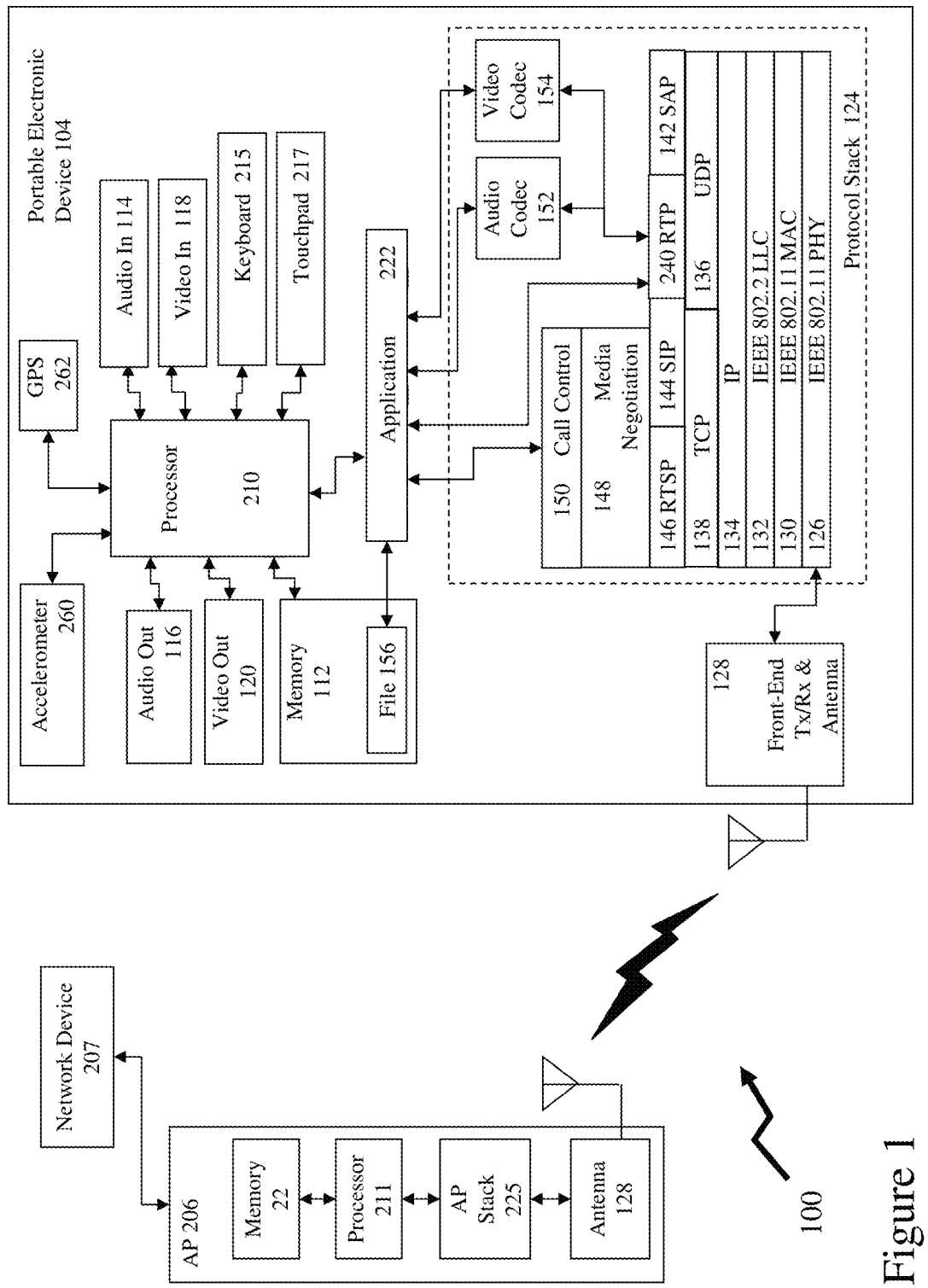
FIG. 1 depicts an electronic device and network access point supporting temporally delayed messaging according to embodiments of the invention.

The present invention is directed to communications systems and more particularly delayed notifications and enhanced sender feedback.

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment. It being understood that various changes may be made in the function and arrangement of elements without departing from the spirit and scope as set forth in the appended claims.

A "portable electronic device" (PED) as used herein and throughout this disclosure, refers to a wireless device used for communications and other applications that requires a battery or other independent form of energy for power. This includes devices, but is not limited to, such as a cellular telephone, smartphone, personal digital assistant (PDA), portable computer, pager, portable multimedia player, portable gaming console, laptop computer, tablet computer, an electronic reader, and a wearable device.

A "fixed electronic device" (FED) as used herein and throughout this disclosure, refers to a wireless and/or wired device used for communications and other applications that requires connection to a fixed interface to obtain power. This includes, but is not limited to, a laptop computer, a personal computer, a computer server, a kiosk, a gaming console, a digital set-top box, an analog set-top box, an Internet enabled appliance, an Internet enabled television, and a multimedia player.

An "application" (commonly referred to as an "app") as used herein may refer to, but is not limited to, a "software application", an element of a "software suite", a computer program designed to allow an individual to perform an activity, a computer program designed to allow an electronic device to perform an activity, and a computer program designed to communicate with local and/or remote electronic devices. An application thus differs from an operating system (which runs a computer), a utility (which performs maintenance or general-purpose chores), and a programming tools (with which computer programs are created). Generally, within the following description with respect to embodiments of the invention an application is generally presented in respect of software permanently and/or temporarily installed upon a PED and/or FED.

A "social network" or "social networking service" as used herein may refer to, but is not limited to, a platform to build social networks or social relations among people who may, for example, share interests, activities, backgrounds, or real-life connections. This includes, but is not limited to, social networks such as U.S. based services such as Facebook, Google+, Tumblr and Twitter; as well as Nexopia, Badoo, Bebo, VKontakte, Delphi, Hi5, Hyves, iWiW, Nasza-Klasa, Soup, Glocals, Skyrock, The Sphere, StudiVZ, Tagged, Tuenti, XING, Orkut, Mxit, Cyworld, Mixi, renren, weibo and Wretch.

"Social media" or "social media services" as used herein may refer to, but is not limited to, a means of interaction among people in which they create, share, and/or exchange information and ideas in virtual communities and networks. This includes, but is not limited to, social media services relating to magazines, Internet forums, weblogs, social blogs, microblogging, wikis, social networks, podcasts, photographs or pictures, video, rating and social bookmarking as well as those exploiting blogging, picture-sharing, video logs, wall-posting, music-sharing, crowdsourcing and voice over IP, to name a few. Social media services may be classified, for example, as collaborative projects (for example, Wikipedia); blogs and microblogs (for example, Twitter™); content communities (for example, YouTube and DailyMotion); social networking sites (for example, Facebook™); virtual game-worlds (e.g., World of Warcraft™); and virtual social worlds (e.g. Second Life™).

An "enterprise" as used herein may refer to, but is not limited to, a provider of a service and/or a product to a user, customer, or consumer. This includes, but is not limited to, a retail outlet, a store, a market, an online marketplace, a manufacturer, an online retailer, a charity, a utility, and a service provider. Such enterprises may be directly owned and controlled by a company or may be owned and operated by a franchisee under the direction and management of a franchiser.

A "service provider" as used herein may refer to, but is not limited to, a third party provider of a service and/or a product to an enterprise and/or individual and/or group of individuals and/or a device comprising a microprocessor. This includes, but is not limited to, a retail outlet, a store, a market, an online marketplace, a manufacturer, an online retailer, a utility, an own brand provider, and a service provider wherein the service and/or product is at least one of marketed, sold, offered, and distributed by the enterprise solely or in addition to the service provider.

A 'third party' or "third party provider" as used herein may refer to, but is not limited to, a so-called "arm's length" provider of a service and/or a product to an enterprise and/or individual and/or group of individuals and/or a device comprising a microprocessor wherein the consumer and/or customer engages the third party but the actual service and/or product that they are interested in and/or purchase and/or receive is provided through an enterprise and/or service provider.

A "user" as used herein may refer to, but is not limited to, an individual or group of individuals whose biometric data may be, but not limited to, monitored, acquired, stored, transmitted, processed and analysed either locally or remotely to the user wherein by their engagement with a service provider, third party provider, enterprise, social network, social media etc. via a dashboard, web service, website, software plug-in, software application, graphical user interface acquires, for example, electronic content. This includes, but is not limited to, private individuals, employees of organizations and/or enterprises, members of community organizations, members of charity organizations, men, women, children, teenagers, and animals. In its broadest sense the user may further include, but not be limited to, software systems, mechanical systems, robotic systems, android systems, etc. that may be characterised as capable of receiving a message and providing a response.

A "wearable device" or "wearable sensor" relates to miniature electronic devices that are worn by the user including those under, within, with or on top of clothing and are part of a broader general class of wearable technology which includes "wearable computers" which in contrast are directed to general or special purpose information technologies and media development. Such wearable devices and/or wearable sensors may include, but not be limited to, smartphones, smart watches, e-textiles, smart shirts, activity trackers, smart glasses, environmental sensors, medical sensors, biological sensors, physiological sensors, chemical sensors, ambient environment sensors, position sensors, neurological sensors, drug delivery systems, medical testing and diagnosis devices, and motion sensors.

"Electronic content" (also referred to as "content" or "digital content") as used herein may refer to, but is not limited to, any type of content that exists in the form of digital data as stored, transmitted, received and/or converted wherein one or more of these steps may be analog although generally these steps will be digital. Forms of digital content include, but are not limited to, information that is digitally broadcast, streamed or contained in discrete files. Viewed narrowly, types of digital content include popular media types such as MP3, JPG, AVI, TIFF, AAC, TXT, RTF, HTML, XHTML, PDF, XLS, SVG, WMA, MP4, FLV, and PPT, for example, as well as others, see for example http://en.wikipedia.org/wiki/List_of_file_formats. Within a broader approach digital content mat include any type of digital information, e.g. digitally updated weather forecast, a GPS map, an eBook, a photograph, a video, a Vine™, a blog posting, a Facebook™ posting, a Twitter™ tweet, online TV, etc. The digital content may be any digital data that is at least one of generated, selected, created, modified, and transmitted in response to a user request, said request may be a query, a search, a trigger, an alarm, and a message for example.

Referring to FIG. 1 there is depicted an electronic device 104 and network access point 107 supporting temporally delayed messaging according to embodiments of the invention. Electronic device 104 may for example be a portable electronic device or a fixed electronic device and may include additional elements above and beyond those described and depicted. Also depicted within the electronic device 104 is the protocol architecture as part of a simplified functional diagram of a system 100 that includes an electronic device 104, such as a smartphone, an access point (AP) 106, such as a Wi-Fi AP, and one or more network devices 107, such as communication servers, streaming media servers, and routers. Network devices 107 may be coupled to AP 106 via any combination of networks, wired, wireless and/or optical communication links such as discussed below in respect of FIG. 2. The electronic device 104 includes one or more processors 110 and a memory 112 coupled to processor(s) 110. AP 106 also includes one or more processors 111 and a memory 113 coupled to processor(s) 111. A non-exhaustive list of examples for any of processors 110 and 111 includes a central processing unit (CPU), a digital signal processor (DSP), a reduced instruction set computer (RISC), a complex instruction set computer (CISC) and the like. Furthermore, any of processors 110 and 111 may be part of application specific integrated circuits (ASICs) or may be a part of application specific standard products (ASSPs). A non-exhaustive list of examples for memories 112 and 113 includes any combination of the following semiconductor devices such as registers, latches, ROM, EEPROM, flash memory devices, non-volatile random access memory devices (NVRAM), SDRAM, DRAM, double data rate (DDR) memory devices, SRAM, universal serial bus (USB) removable memory, and the like.

Electronic device 104 may include an audio input element 114, for example a microphone, and an audio output element 116, for example, a speaker, coupled to any of processors 110. Electronic device 104 may include a video input element 118, for example, a video camera, and a video output element 120, for example an LCD display, coupled to any of processors 110. Electronic device 104 also includes a keyboard 115 and touchpad 117 which may for example be a physical keyboard and touchpad allowing the user to enter content or select functions within one of more applications 122. Alternatively, the keyboard 115 and touchpad 117 may be predetermined regions of a touch sensitive element forming part of the display within the electronic device 104. The one or more applications 122 that are typically stored in memory 112 and are executable by any combination of processors 110. Electronic device 104 also includes accelerometer 160 providing three-dimensional motion input to the process 110 and GPS 162 which provides geographical location information to processor 110.

Electronic device 104 includes a protocol stack 124 and AP 106 includes a communication stack 125. Within system 100 protocol stack 124 is shown as IEEE 802.11 protocol stack but alternatively may exploit other protocol stacks such as an Internet Engineering Task Force (IETF) multimedia protocol stack for example. Likewise, AP stack 125 exploits a protocol stack but is not expanded for clarity. Elements of protocol stack 124 and AP stack 125 may be implemented in any combination of software, firmware and/or hardware. Protocol stack 124 includes an IEEE 802.11-compatible PHY module 126 that is coupled to one or more Front-End Tx/Rx & Antenna 128, an IEEE 802.11-compatible MAC module 130 coupled to an IEEE 802.2-compatible LLC module 132. Protocol stack 124 includes a network layer IP module 134, a transport layer User Datagram Protocol (UDP) module 136 and a transport layer Transmission Control Protocol (TCP) module 138.

Protocol stack 124 also includes a session layer Real Time Transport Protocol (RTP) module 140, a Session Announcement Protocol (SAP) module 142, a Session Initiation Protocol (SIP) module 144 and a Real Time Streaming Protocol (RTSP) module 146. Protocol stack 124 includes a presentation layer media negotiation module 148, a call control module 150, one or more audio codecs 152 and one or more video codecs 154. Applications 122 may be able to create maintain and/or terminate communication sessions with any of devices 107 by way of AP 106. Typically, applications 122 may activate any of the SAP, SIP, RTSP, media negotiation and call control modules for that purpose. Typically, information may propagate from the SAP, SIP, RTSP, media negotiation and call control modules to PHY module 126 through TCP module 138, IP module 134, LLC module 132 and MAC module 130.

It would be apparent to one skilled in the art that elements of the electronic device 104 may also be implemented within the AP 106 including but not limited to one or more elements of the protocol stack 124, including for example an IEEE 802.11-compatible PHY module, an IEEE 802.11-compatible MAC module, and an IEEE 802.2-compatible LLC module 132. The AP 106 may additionally include a network layer IP module, a transport layer User Datagram Protocol (UDP) module and a transport layer Transmission Control Protocol (TCP) module as well as a session layer Real Time Transport Protocol (RTP) module, a Session Announcement Protocol (SAP) module, a Session Initiation Protocol (SIP) module and a Real Time Streaming Protocol (RTSP) module, media negotiation module, and a call control module.

Portable and fixed electronic devices represented by electronic device 104 may include one or more additional wireless or wired interfaces in addition to the depicted IEEE 802.11 interface which may be selected from the group comprising IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, IMT-2000, DSL, Dial-Up, DOCSIS, Ethernet, G.hn, ISDN, MoCA, PON, and Power line communication (PLC).

Figure 2:
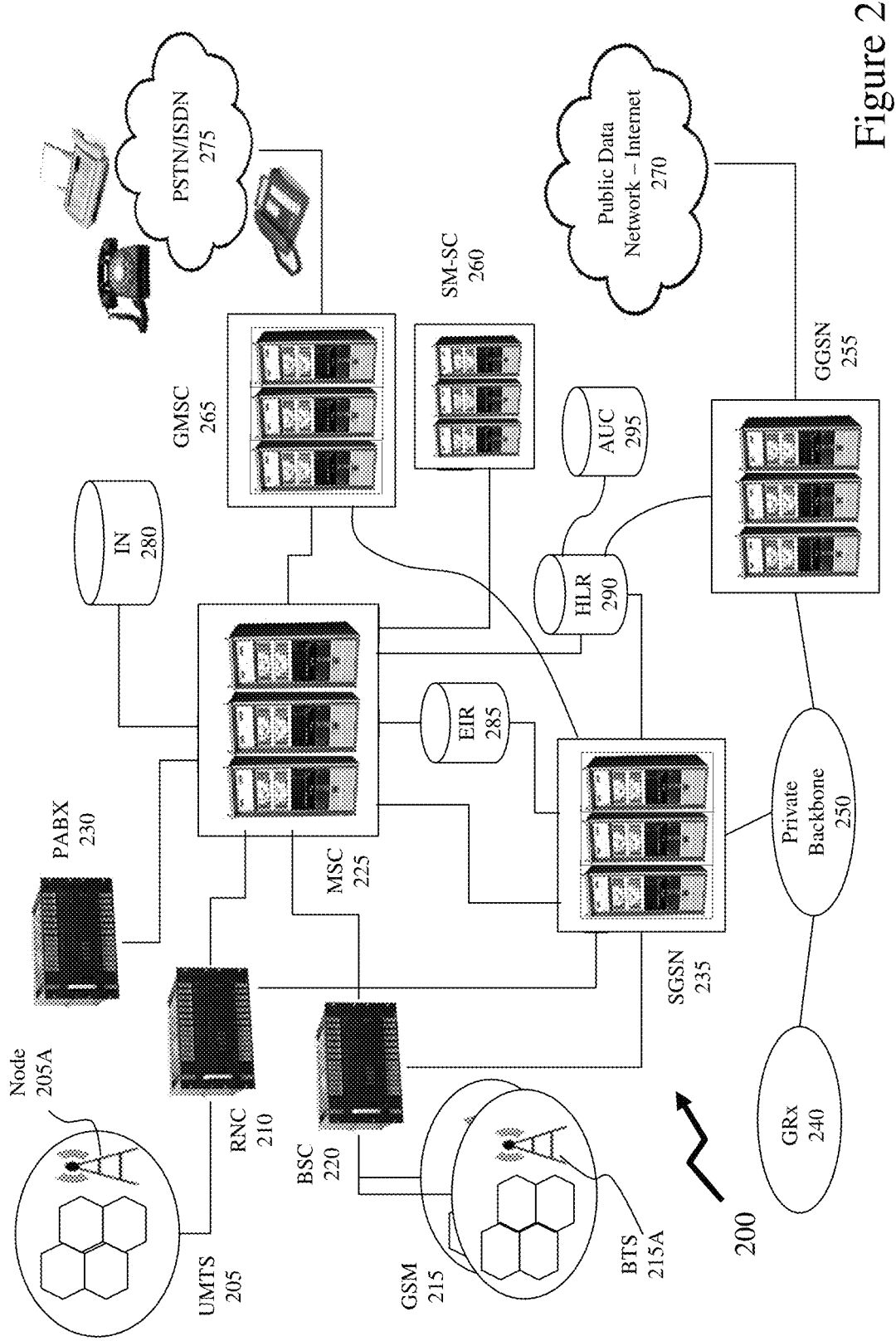
FIG. 2 depicts a network supporting communications to and from electronic devices implementing temporally delayed messaging according to embodiments of the invention.

FIG. 2 depicts a 2G/3G network 200 supporting communications to and from electronic devices implementing temporally delayed messaging according to embodiments of the invention. As depicted 2G/3G network 200 comprises multiple elements described supra in respect of FIG. 1 such as a portion of network 100, remote central exchange 180, and first and second wireless access points (AP) 195A and 195B respectively. However, 2G/3G network 200 depicts that predetermined portion of network 100 in particular and in more detail that relates to the wireless support for FEDs and PEDs. 2G/3G network 200 supports so-called 2G (second generation) wireless telephone technology standards such as GSM (Global System for Mobile Communications, originally Groupe Special Mobile) implemented in GSM 850 MHz, GSM 900 MHz, GSM 1800 MHz, and GSM 1900 MHz exploiting primarily TDMA (Time Division Multiple Access). 2G/3G network 200 also supports other 2G/3G (third generation) wireless telephone technology standards such as GPRS (General Packet Radio Service) and 3G standards such as UMTS (Universal Mobile Telecommunications System). Whilst 4G (fourth generation) wireless telephone technology standards are not discussed in respect of 2G/3G network 200 it would be evident to one skilled in the art that such standards as IMT-2000 and IMT-Advanced ((International Mobile Telecommunications) embodied in LTE-Advanced (Long-Term Evolution Advanced), IEEE 802.16m (WirelessMAN), 3GPP (3G Partnership Project) LTE and IEEE 802.16e (Mobile WiMAX) may also be supported through variations in the 2G/3G network 200 elements, additional infrastructure, and software/firmware for example. As depicted a 3G UMTS cell 205 is addressed by Node 205A, for example a wireless access point, providing UMTS services to users connected to the UMTS cell 205 from their FEDs/PEDs. Node 205A communicates with a Radio Network Controller (RNC) 210 which is then in communication with Mobile Switching Center (MSC) 225 and Serving GPRS Support Node (SGSN) 235.

Also depicted is GSM cell 215 addressed by Base Transceiver Station (BTS) 215A, for example such as described supra in respect of first and second wireless access points (AP) 195A and 195B respectively in FIG. 1, providing GSM services to users connected to the GSM cell 215 via their FEDs/PEDs. The BTS 215A is similarly in communication with the MSC 225 and SGSN 235 respectively as is Node 205A and these are also coupled to one another via direct communications link and Equipment Identity Register (EIR) 285 which maintains a database with records of all the mobile stations (MS) that are allowed in a network as well as a database of all equipment that is banned, e.g. because it is lost or stolen for example. Accordingly, FEDs/PEDs registering with one or other of the UMTS and/or GSM networks are registered into the EIR 285 and validated. Also coupled to MSC 225 are a Private Automatic Branch eXchange (PABX) 230, denoting an exchange serving a particular business or enterprise as opposed to one operated by a telecom carrier that operates for many businesses or for the general public, and an IN Database 280 used in conjunction with an Intelligent Network Application Part (INAP) signaling protocol used for controlling telecommunication services migrated from traditional switching points to computer based service independent platforms such as for example 0800 free phone access.

MSC 225 and SGSN 235 also communicate with Home Location Register (HLR) 290 which provides a central database containing details of each subscriber authorized to use the core network. HLR 290 also communicates with Gateway GPRS Support Node (GGSN) 255 which provides a gateway interconnection between the packet mobile networks, e.g. GPRS, GSM, and UMTS, and the public data network (Internet) 270. Accordingly, a user accessing their PED in GSM cell 215 has their communications routed through BSC 220, SGSN 235 via Private Backbone 250 to GGSN 255 and therein the Internet 270. The device and account verification for a user is performed through the polling of EIR 285 and HLR 290. Verification through HLR 290 also invokes Authentication Centre (AUC) 295 which authenticates each SIM card that attempts to connect to the network thereby allowing the HLR 290 to manage the SIM and services. This authentication also includes, typically, generation of an encryption key which is subsequently used to encrypt all wireless communications, such as voice and Simple Message Service (SMS) for example, between the mobile phone and the GSM core network.

Also connected to the Private Backbone 250 is GPRS Roaming Exchange (GRX) which acts as a hub for GPRS connections from roaming users thereby removing the need for dedicated link between each GPRS service provider and hence between multiple 2G/3G networks 200. The MSC 225 as depicted is also coupled to Short Message Service Center (SM-SC) 260 such that SMS messages send by users are stored within the SM-SC 260 which delivers each SMS message to its destination user when they are available, i.e. when they access via UMTS 205 or GSM 215 for example and their presence is determined through the verification and authentication processes with EIR 285, HLR 290, and AUC 295 which are accessible by SM-SC 260 via MSC 225. Also connected to the MSC 225 is Gateway Mobile Switching Center (GMSC) which determines which visited MSC the subscriber being called is currently located as well as routing all communications to/from PEDs and the Public Switched Telephone Network (PSTN)/Integrated Services Digital Network (ISDN) 275 which handles services including Plain Old Telephony Service (POTS) as well as simultaneous digital transmission of voice, video, data, and other network services over the traditional circuits such as copper wire.

It would be evident to one skilled in the art that a contact opening an email does not automatically mean that they actually read the email and that other actions such as reading part of the email message contents, the contact deleting the email message, or the email message being transferred to a "junk" or "spam" folder may occur that result in the user not receiving notice that the contact has opened and reviewed the email or understood the message. In some email systems the contact is provided with a pop-up window indicating that a read receipt has been requested and provides options to the contact to either send such a receipt or not send it.

Accordingly, it would be beneficial in many instances where email messages and/or voicemail messages are sent containing time sensitive information, as well as other electronic communications such as SMS messages (text messages or texts), that the contact is aware as to whether the message has been received, that the pertinent information is read, and the contact can undertake other actions should they be required due to the nature of the contents of the message sent to the contact. In other situations, a user may decide to send a message to a contact on the basis that they do not wish to have the contact receive the message immediately. For example, a user may decide to leave a message at a time that they know, or suspect is inconvenient for the contact or at a time they do not wish to disturb the contact. Examples of such instances may include, but not limited to, middle of the night, very early in the morning and evening. Equally, the embodiments of the invention in addition to providing these benefits allow for timed messaging to be established as part of a marketing campaign or other business related activity. For example, an enterprise may establish a SMS release to a predetermined client group offering a limited time offer and verify the clients who actually opened the message within the time limit whilst allowing redemption upon a different time frame. It would be evident to one skilled in the art that other applications exist exploiting such time and verification based messaging.

Figure 3A:
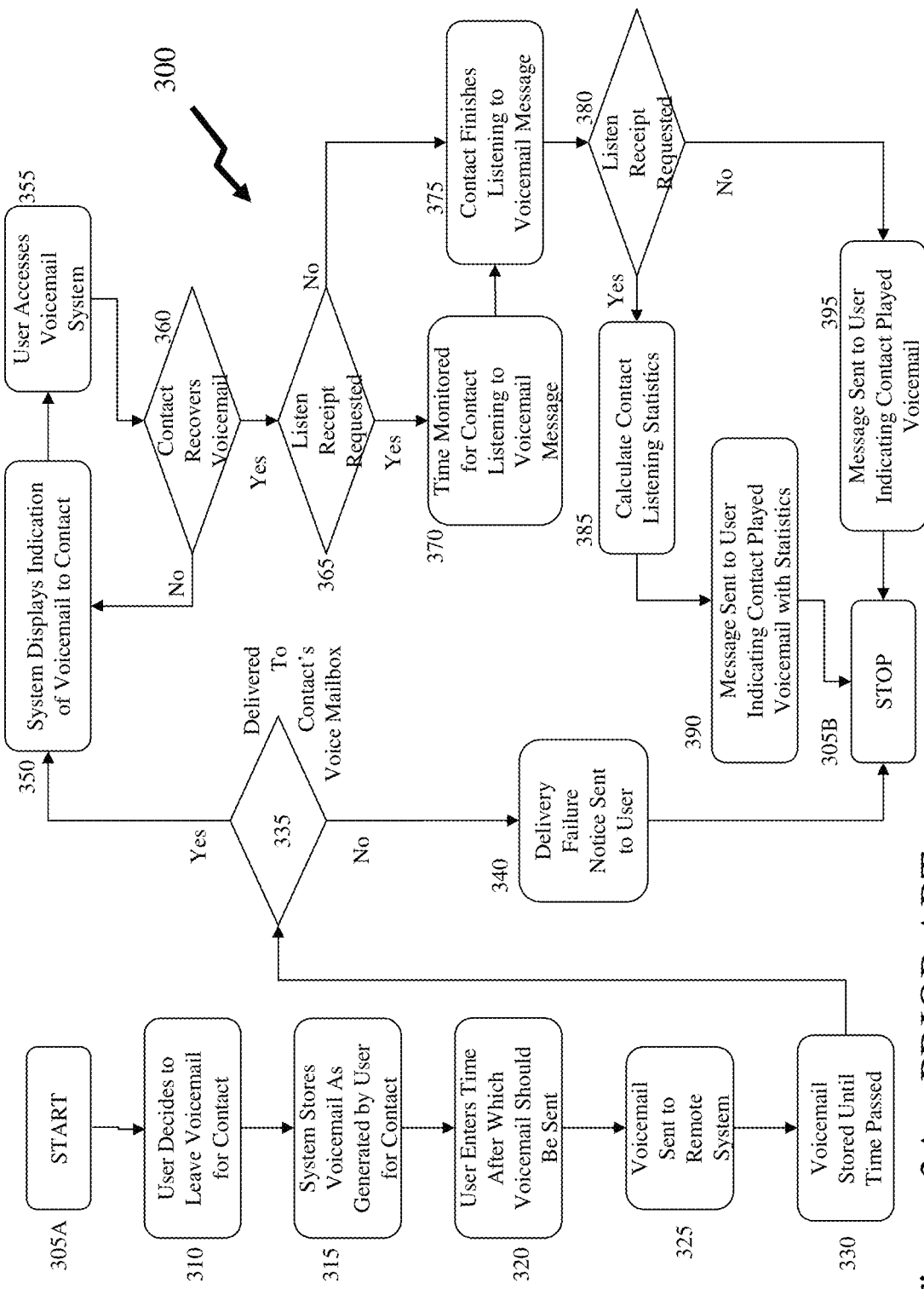
FIG. 3A depicts a process flow for a voicemail delivery system according to the prior art for delayed message notifications.

Now referring to FIG. 3A there is depicted a process flow 300 for a voicemail delivery system according to the prior art of the inventors in World Patent Application WO/2014/067,974 entitled "Methods and Systems for Delayed Notification in Communication Networks." The process begins at step 305A and proceeds to step 310 wherein a user decides to send a voicemail to a contact on the basis that they do not wish to have the contact receive the message immediately and also to know that the contact has received the content within the message. Accordingly, in process step 315 the voicemail software system allows the user to generate a voicemail for a contact at a contact number wherein the software system stores the voicemail generated by the user for the contact within memory. Next in step 320 the user enters the later point in time that they wish the voicemail message to be provided to the contact wherein voicemail message and timing information are transferred in step 325 from the voicemail system to a remote system wherein it is stored in step 330 until the indicated time has passed at which point it is sent to the contact number of the contact provided by the user in generating the voicemail.

The process then proceeds to step 335 wherein a determination is made as to whether the voicemail was delivered to the contact's voice inbox or not. If not, then the process flow 300 proceeds to step 340 wherein a delivery failure notice is provided to the user and the process proceeds to step 305B and stops. Upon successful delivery of the voicemail to the contact's voice inbox the process flow proceeds to step 350 and an indication of a voicemail is provided to the contact on the device or devices associated with their voice inbox. Subsequently the contact in step 355 accesses their voicemail system and a determination is made in step 360 as to whether the contact recovered the voicemail. If that determination is negative then the process loops back to step 350 so that an indication of un-played voicemails is provided to the contact. If it is positive then the process proceeds to step 365 wherein it is determined whether a read receipt for the voicemail has been requested by the user in generating the voicemail. If not then the process proceeds to step 370 wherein the contact listens to that portion of the voicemail message that they decide to and the process proceeds to a second decision in step 380 on the read receipt which results in the process proceeding to step 395 wherein a first status message is sent to the user indicating that the contact did at least "open" the voicemail.

Alternatively, the process proceeds from step 365 to step 370 wherein a timer is initiated with respect to the contact listening to the message in step 375. Accordingly, after the contact has stopped listening to the voicemail message the second decision in step 380 directs the process flow to step 385 wherein listening statistics relating to the voicemail playback by the contact are calculated. For example, this may be length of message, length of message played back, and percentage of message listened to. From step 385 the process proceeds to terminate in step 305B via process step 390 where the user who sent the message is sent a message containing the listening statistics as part of the message indicating the contact played the voicemail. Accordingly, the user may ascertain how much of the message the contact listened to and based upon knowledge of the voicemail they generated whether the contact played the portion containing the important core element of their message.

Optionally, as there may be a significant delay between step 335 wherein there is a determination that the message has been delivered to the contact's voice inbox and steps 390 and 395, wherein a message is provided to the user that the contact has played the voicemail with or without call statistics, an additional message may be provided between steps 335 and 350 to indicate to the user that the message has been delivered successfully to the contact.

Figure 3B:
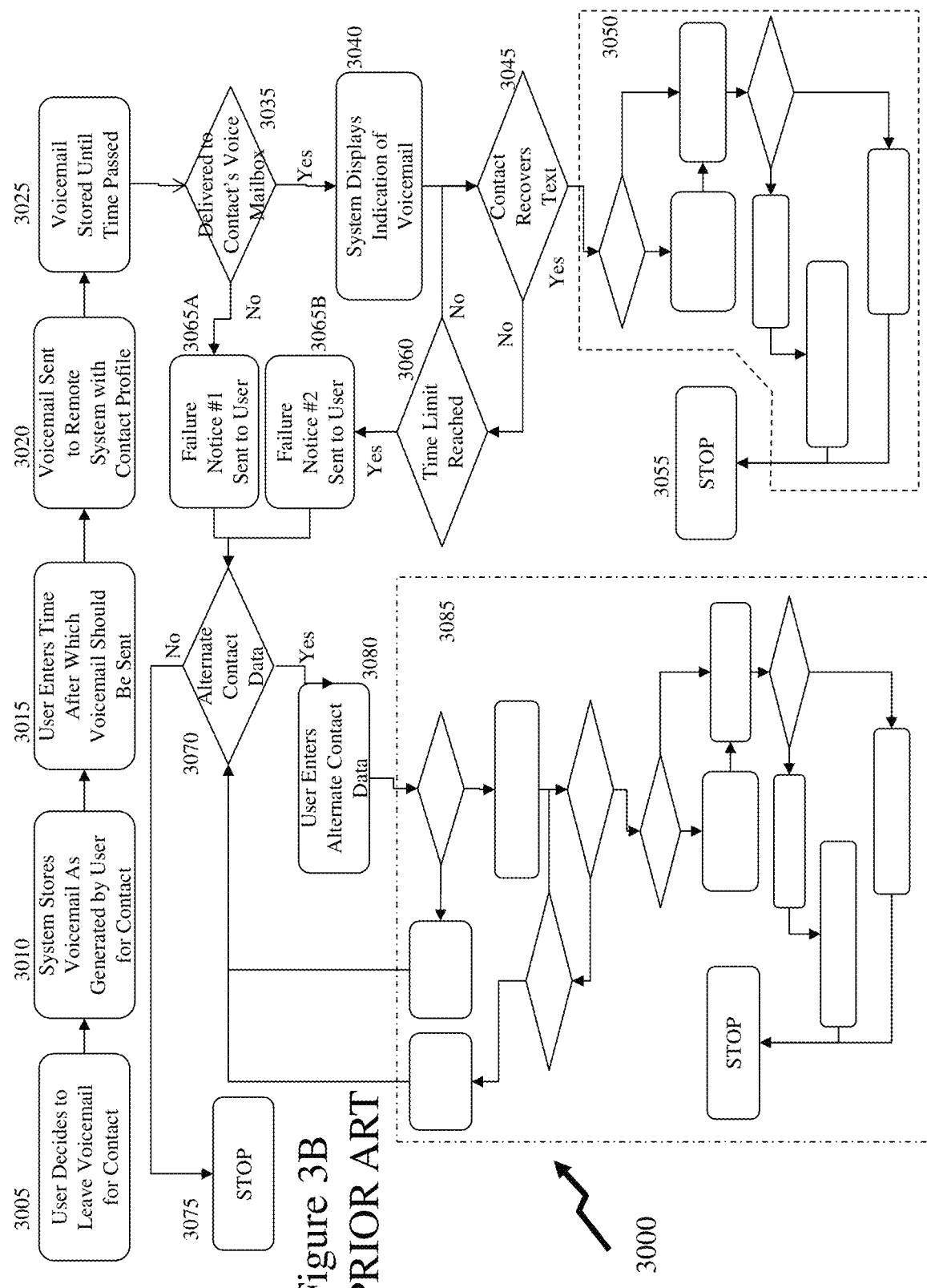
FIG. 3B depicts a process flow for a voicemail delivery system according to the prior art allowing the user to modify contact delivery information upon a failed initial delivery with delayed message notification.

Now referring to FIG. 3B there is depicted a process flow 3000 for a voicemail delivery system according to the prior art of the inventors in World Patent Application WO/2014/067,974 entitled "Methods and Systems for Delayed Notification in Communication Networks" allowing the user to modify contact delivery information upon a failed initial delivery. Accordingly, as shown in process steps 3005 through 3025 the user proceeds in a manner essentially the same as that described in respect of steps 310 through 330 respectively in FIG. 3A in that the user decides to send a voicemail to a contact, enters the time after which the voicemail message should be delivered, and the voicemail is transferred to a remote system for storage until the predetermined time set by the user has elapsed. However, the user the also establishes a second time limit relating to a subsequent time after delivery wherein the user wishes to know whether the contact retrieved the message or not. Subsequently a determination is made in step 3035 as to whether the voicemail message has been delivered to the contact's voice mailbox resulting in the process proceeding to step 3040 if a positive determination is made and the system displays an indication of the voicemail message to the contact and proceeds to step 3065A if a negative determination is made wherein a voicemail failure notice #1 is sent to the user.

If a positive determination was made then after step 3040 the process determines in step 3045 whether the contact has recovered the voicemail wherein if a negative determination is made the process proceeds to step 3060 and a determination is made as to whether the time limit set by the user in respect of the contact recovering the voicemail message has been exceeded. A positive determination results in the process proceeding to step 3065B and a voicemail failure notice #2 is sent to the user indicating that the message was delivered but the predetermined limit set by the user has expired. If in step 3045 the determination was that the contact had recovered the voicemail message then the process proceeds to first sub-process block 3050 which comprises a series of process steps similar to those described above in respect of FIG. 3A and process steps 370 through 395 in determining whether read receipts and contact recovery statistics are required. Upon completion of first sub-process block 3050 the process proceeds to step 3055 and stops.

For either of process steps 3065A and 3065B the process proceeds to step 3070 wherein a determination is made as to whether alternate contact information is to be entered by the user. If a negative determination is made the process proceeds to step 3075 and stops, otherwise a positive determination results in the process proceeding to step 3080 wherein the user enters alternate contact data, such as for example changing a contact's PED number to their home telephone number. Subsequently the process flow 3000 proceeds to second sub-process block 3085 which comprises essentially the same process steps and logical determinations as discussed supra in respect of process steps 3035 through 3050, 3060 and 3065. A repeat failure of the contact to recover the voicemail or failure to deliver the voicemail results in the process flow 3000 returning to process step 3070.

It would be evident that according to another embodiment of the invention the determination in step 3070 regarding alternate contact data for the contact may be made based upon information entered by the user during initial process steps 3005 through 3025 respectively wherein the user enters multiple alternate contact data and the process flow 3000 sequentially tries each contact number for the contact. Optionally, the time limit post-delivery of each voicemail message to an alternate number may be varied.

Optionally, as there may be a significant delay between step 3035, wherein there is a determination that the message has been delivered to the contact's voice inbox, and steps 3060 and 3065B, wherein a message is provided to the user upon failure of the contact to recover the text message within the time limit set that the contact has not played the voicemail, then an additional message may be provided between steps 3035 and 3040 to indicate to the user whether the message has been delivered successfully to the contact. Accordingly, the user may determine upon receipt of such a message to initiate a message via an alternate means.

FIGS. 3A and 3B provide for the ability of a user to delay the sending of a message intended for a recipient. Other processes relating to delayed message notifications are described within the prior art of the inventors in World Patent Application WO/2014/067,974 entitled "Methods and Systems for Delayed Notification in Communication Networks."

Figure 4:
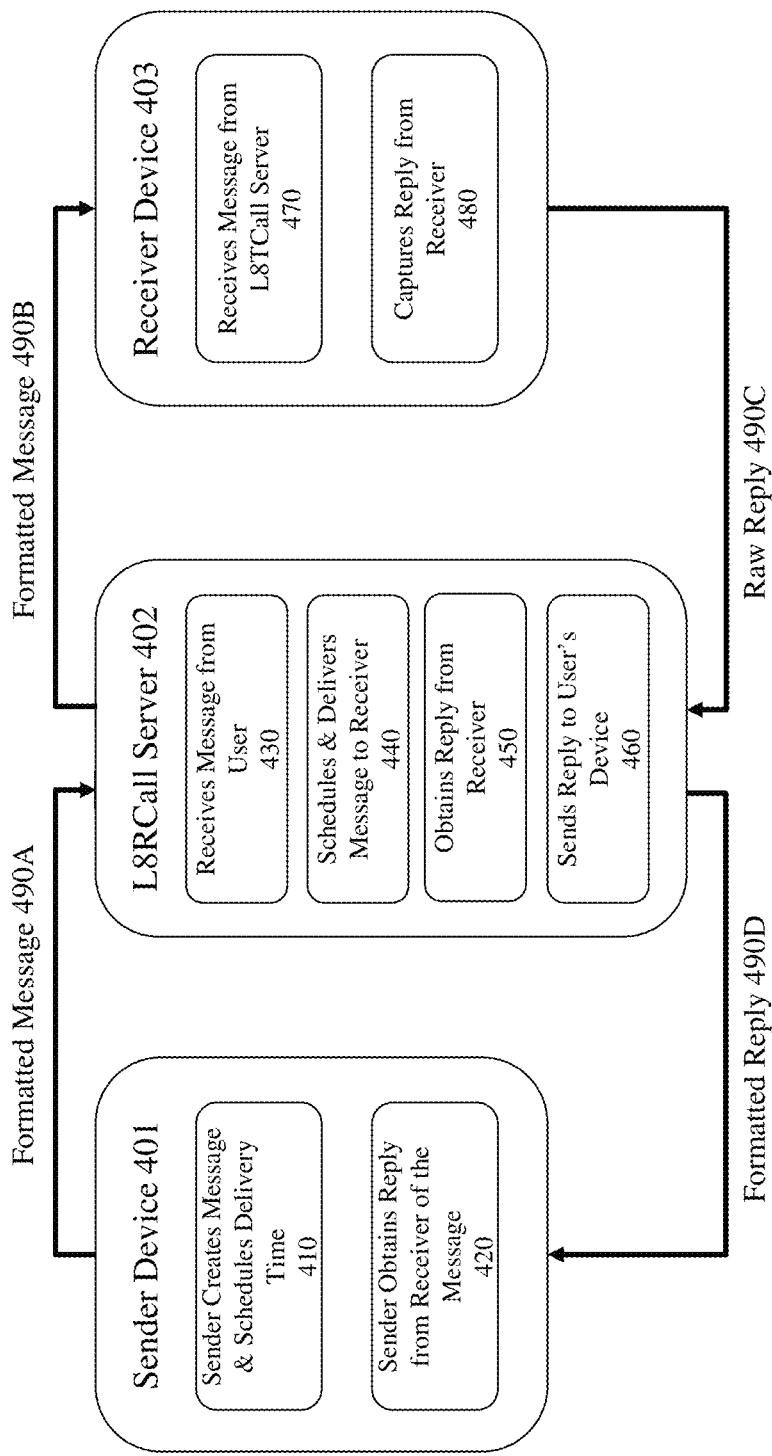
FIG. 4 depicts a basic message process flow according to an embodiment of the invention.

FIG. 4 depicts a basic message process flow according to an embodiment of the invention between a sender device 401, e.g. a PED or FED associated with a user wishing to send a message, a server such as L8RCall Server 402 associated with L8RCall as provided by RideShark Inc. of Ottawa, Ontario, Canada), and a receiver device 403, e.g. a PED or FED associated with a user for whom a message is intended. Accordingly, as depicted in step 410 the user creates a message and as discussed above in respect of FIGS. 3A and 3B schedules a delivery time for the message wherein a first formatted message 490A is transmitted from the sender device 401 to the L8RCall Server 402. The L8RCall Server 402 receives the message from the user in step 430 and then schedules and delivers the message to the receiver device 403 based upon the data provided by the sender when generating the message in step 410. Subsequently, at the designated time the receiver device 403 receives in step 470 a second formatted message 490B from the sender as received from the L8RCall Server 402. In step 480 the receiver device 403 captures the reply from the receiving user in step 480 and transmits the raw reply 490C to the L8RCall Server 402 wherein it is received in step 450. The L8RCall Server 402 then formats the raw reply in step 460 and transmits this as formatted reply 490D to the sender device 401 wherein it is presented to the user in step 420.

Figure 5:
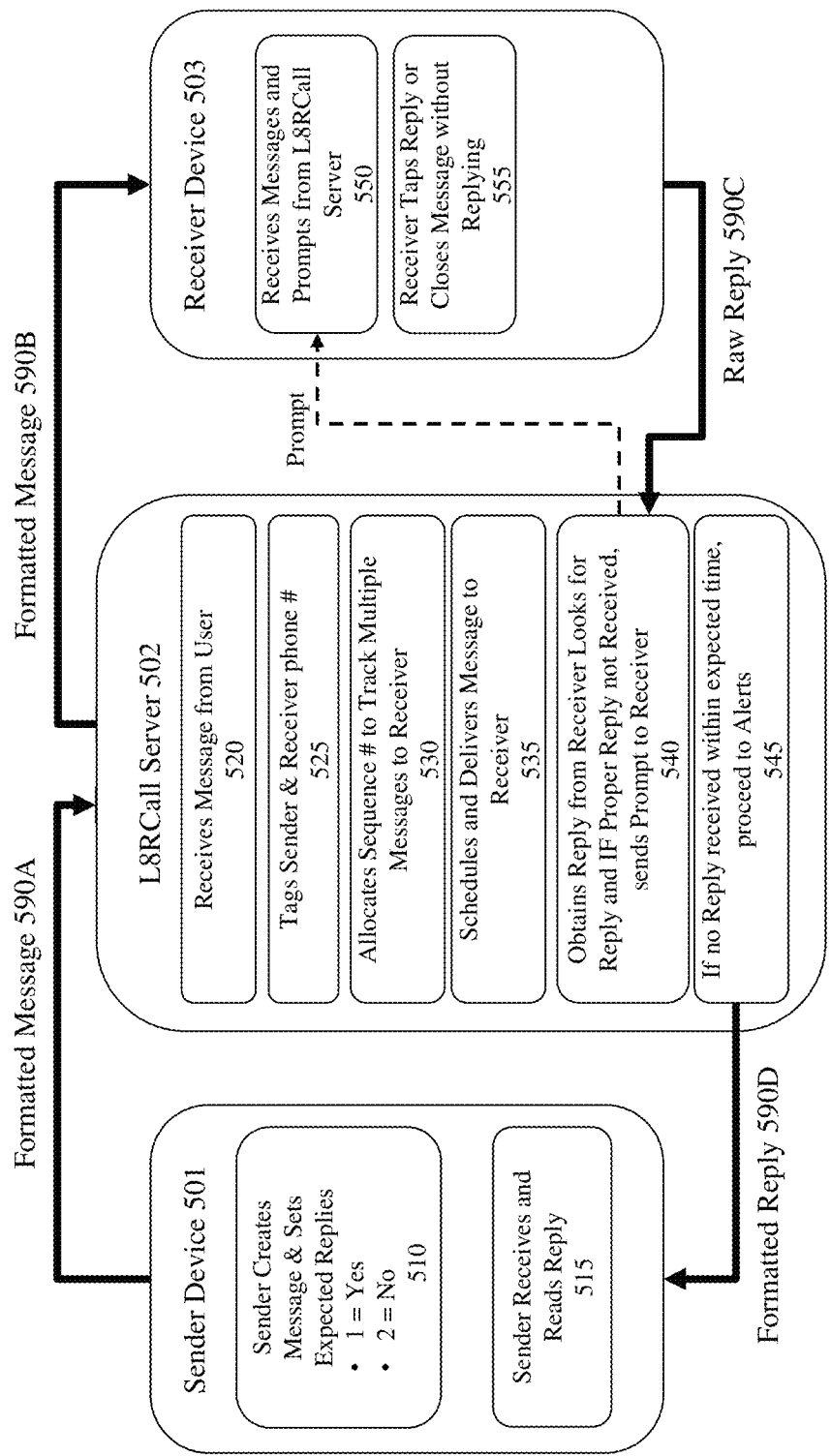
FIG. 5 depicts a detailed message process flow for a text message according to an embodiment of the invention.

Now referring to FIG. 5 there is depicted a detailed message process flow for a text message according to an embodiment of the invention between a sender device 501, e.g. a PED or FED associated with a user wishing to send a message, a server such as L8RCall Server 502, and a receiver device 503, e.g. a PED or FED associated with a user for whom a message is intended. Accordingly, as depicted in step 510 the user creates a message and as discussed above in respect of FIGS. 3A and 3B schedules a delivery time for the message. However, in addition to the message the user sets expected replies, e.g. "1=Yes" and "2=No." This together with the message is combined into first formatted message 590A which is transmitted from the sender device 501 to the L8RCall Server 502. The L8RCall Server 502 receives the message from the user in step 520 and then tags the sender and receiver telephone numbers in step 525. Next in step 530 the L8RCall Server 502 allocates a sequence number to the message allowing the tracking of multiple messages to the receiver device 503 before scheduling and delivering the message to the receiver device 503 in step 535 based upon the data provided by the sender when generating the message in step 510.

Figure 15:
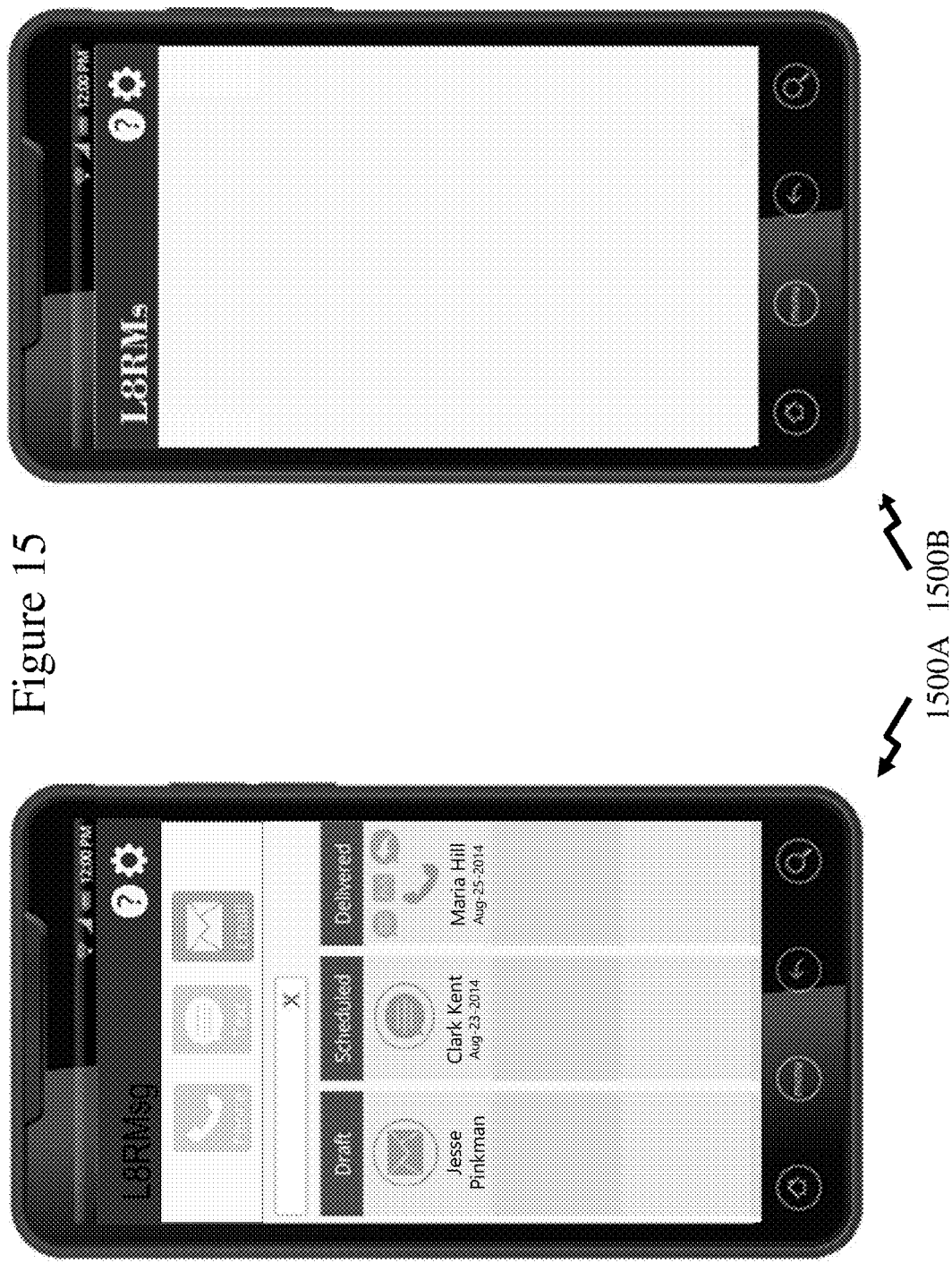
FIGS. 15 and 16 depict exemplary screen images of a software application according to an embodiment of the invention showing visual flow format and message tracking aspects of the software application together with advanced feature access.

Accordingly, at the designated time the receiver device 503 receives in step 550 a second formatted message 590B from the sender as received from the L8RCall Server 502. The second formatted message 590B also contains the prompts, i.e. expected replies established in step 510. In step 555 the recipient upon viewing the message either taps a reply based upon the prompts or closes the message without replying. Where the user taps a reply then the receiver device 503 captures the reply from the receiving user and transmits a raw reply 590C to the L8RCall Server 502 wherein it is received in step 540. If the reply from the receiver device 503 matches a prompt established by the sender then the L8RCall Server 502 generates a formatted reply 590D for transmission to the sender device 501 wherein the sender receives and reads the reply in step 515. However, if a reply is received and is not a proper reply then a prompt is sent to the receiver device 503 to remind the recipient that they need to provide a reply. If no reply from the recipient is received, valid or not, then the process proceeds to step 545 and generates one or more alerts. Within an embodiment of the invention this alert may be transmitted as a formatted reply 590D therein allowing the user to establish an alternate communications route to the recipient, such as described within WO/2014/067,974 entitled "Methods and Systems for Delayed Notification in Communication Networks" by the inventors. Alternatively, the alert may contain other information such as delivery information as described in respect of second screen image 1500B in FIG. 15.

Figure 6:
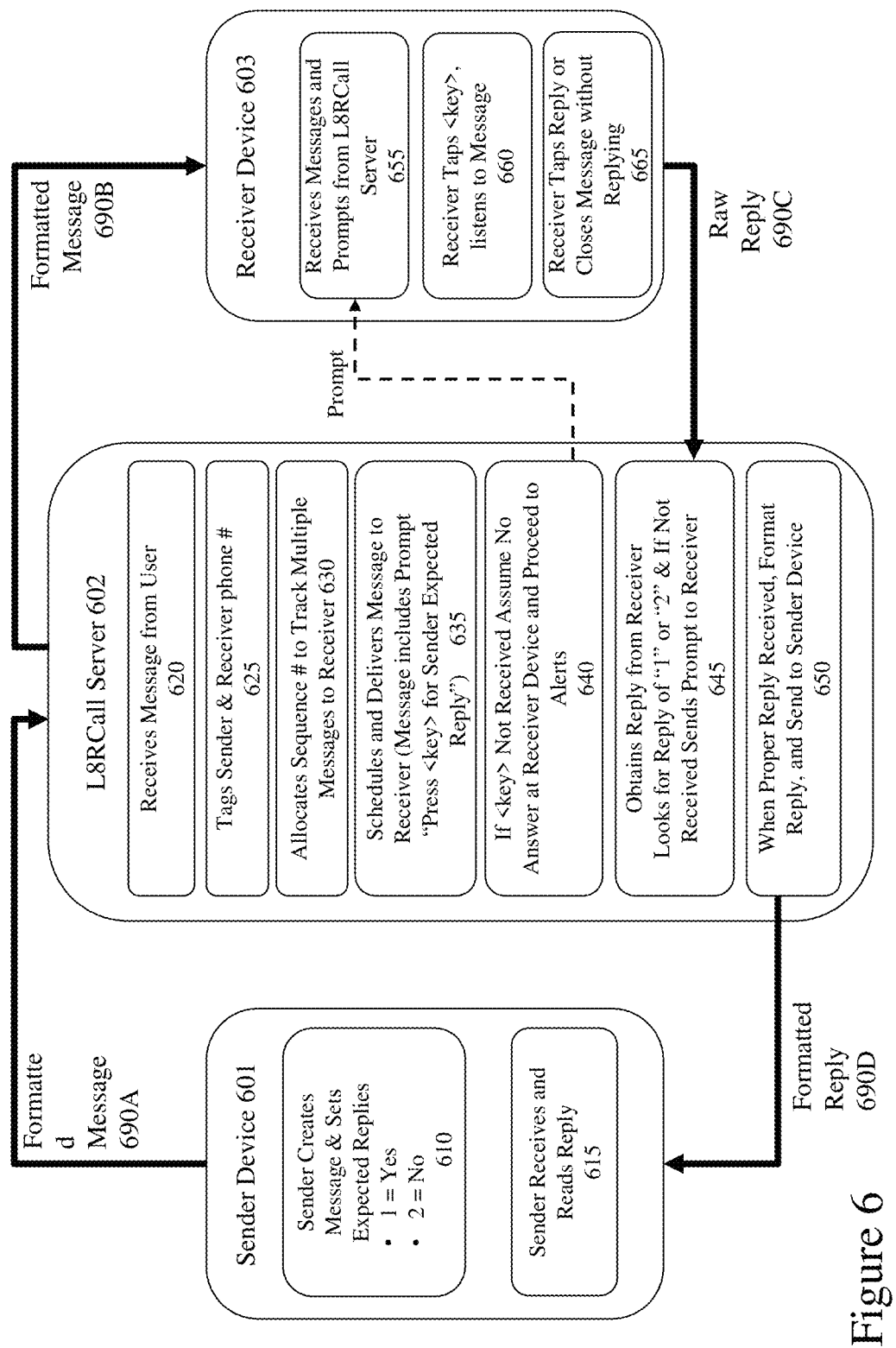
FIG. 6 depicts a detailed message process flow for a voice message according to an embodiment of the invention.

Now referring to FIG. 6 there is depicted a detailed message process flow for a voice message according to an embodiment of the invention between a sender device 601, e.g. a PED or FED associated with a user wishing to send a message, a server such as L8RCall Server 602, and a receiver device 603, e.g. a PED or FED associated with a user for whom a message is intended. Accordingly, as depicted in step 610 the user creates a message and as discussed above in respect of FIGS. 3A and 3B schedules a delivery time for the message. However, in addition to the message the user sets expected replies, e.g. "1=Yes" and "2=No." This together with the message is combined into first formatted message 690A which is transmitted from the sender device 601 to the L8RCall Server 602. The L8RCall Server 602 receives the message from the user in step 620 and then tags the sender and receiver telephone numbers in step 625. Next in step 630 the L8RCall Server 602 allocates a sequence number to the message allowing the tracking of multiple messages to the receiver device 603 before scheduling and delivering the message to the receiver device 603 in step 635 based upon the data provided by the sender when generating the message in step 610.

Accordingly, at the designated time the receiver device 603 receives in step 655 a second formatted message 690B from the sender as received from the L8RCall Server 602. The second formatted message 690B contains audible prompts for the recipient based upon the expected replies established in step 610 in addition to the message from the sender, e.g. "Press # to Listen to the Sender Options" followed by "Press 1 for Yes and 2 for No." In step 660 the recipient upon listening to the message taps the defined key and then receives in step 665 the options in the audible message and either taps a reply based upon the prompts or closes the message without replying. Where the user taps a reply then the receiver device 603 captures the reply from the receiving user and transmits a raw reply 690C to the L8RCall Server 602 wherein it is received in step 640. If no reply from the receiver device 603 is received in step 640 then the L8RCall Server 602 proceeds to generate one or more alerts. Within an embodiment of the invention this alert may be transmitted as a formatted reply 690D therein allowing the user to establish an alternate communications route to the recipient, such as described within WO/2014/067,974 entitled "Methods and Systems for Delayed Notification in Communication Networks" by the inventors. Alternatively, the alert may contain other information such as delivery information as described in respect of second screen image 1500B in FIG. 15.

When the raw reply 690C is received then the L8RCall Server 602 looks for a reply matching an expected reply established by the sender in step 645 and if a reply is received and is not a proper reply then a prompt is sent to the receiver device 603 to remind the recipient that they need to provide a reply. Where a proper reply is received the L8RCall Server 602 formats a reply and sends it to the sender device 650 wherein it is received in step 615 and presented to the user for their review.

Figure 7:
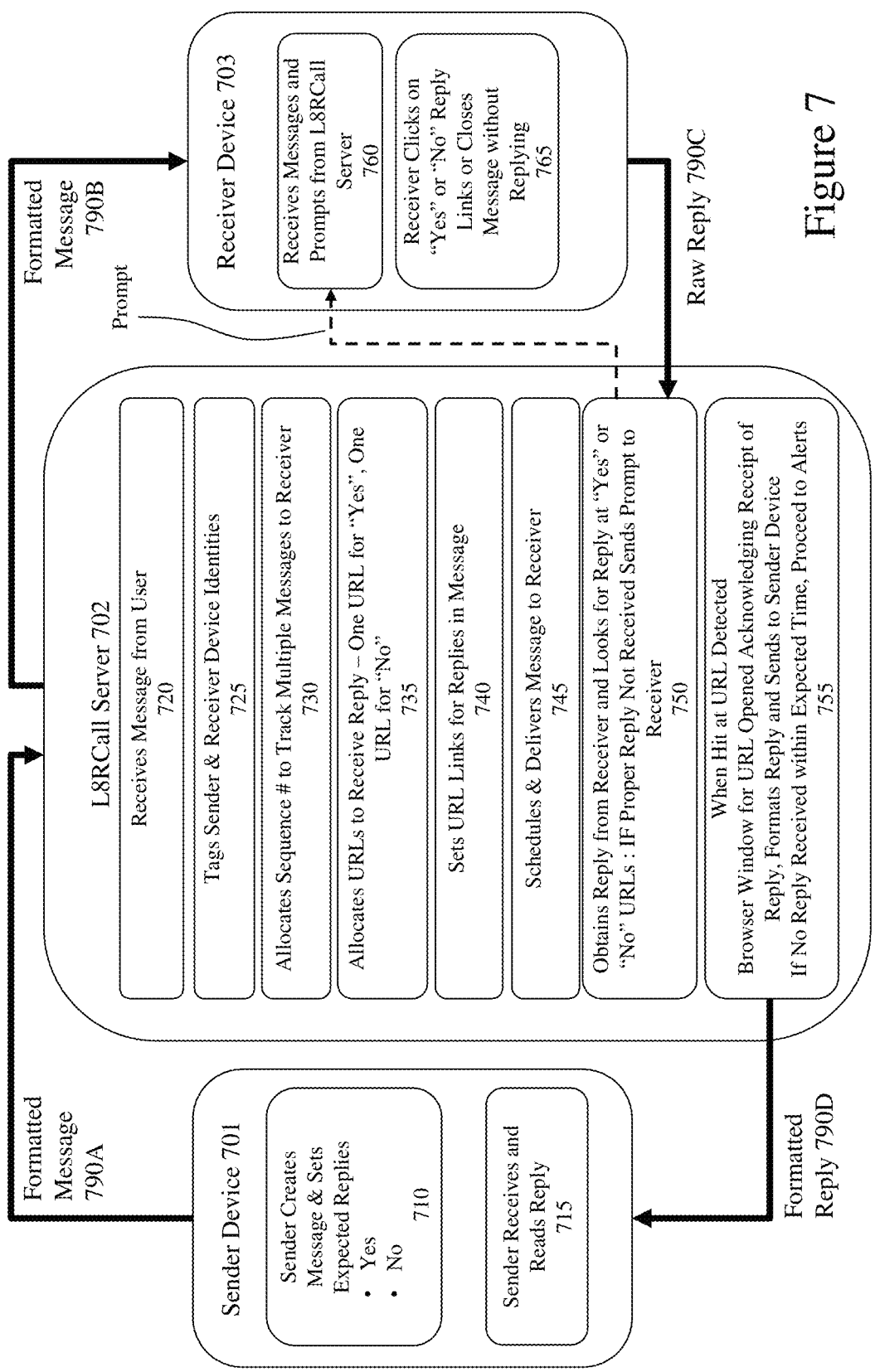
FIG. 7 depicts a detailed message process flow for an email message according to an embodiment of the invention.

Now referring to FIG. 7 there is depicted a detailed message process flow for an email message according to an embodiment of the invention between a sender device 701, e.g. a PED or FED associated with a user wishing to send a message, a server such as L8RCall Server 702, and a receiver device 703, e.g. a PED or FED associated with a user for whom a message is intended. Accordingly, as depicted in step 710 the user creates a message and as discussed above in respect of FIGS. 3A and 3B schedules a delivery time for the message. However, in addition to the message the user sets expected replies, e.g. "Yes" and "No." This together with the message is combined into first formatted message 790A which is transmitted from the sender device 701 to the L8RCall Server 702. The L8RCall Server 702 receives the message from the user in step 720 and then tags the sender and receiver device identities in step 725. Next in step 730 the L8RCall Server 702 allocates a sequence number to the message allowing the tracking of multiple messages to the receiver device 703. Next in step 735 the L8RCall Server 702 allocates a Uniform Resource Locator (URL) to each expected reply established by the sender. These URL links are then established within the message to be sent to the recipient device 703 based upon their electronic address(es) associated with the recipient device 703 before scheduling and delivering the message to the receiver device 703 in step 745.

Accordingly, at the designated time the receiver device 703 receives in step 760 a second formatted message 790B from the sender as formatted and generated by the L8RCall Server 702. The second formatted message 790B therefore contains the message and links to the URLs associated with the expected replies established by the sender. In step 765 the recipient upon reading the message either selects a URL link or closes the message without replying. Where the user selects a URL link then the receiver device 703 captures the reply from the receiving user and transmits a raw reply 790C to the L8RCall Server 702 wherein it is received in step 750. If, however, no reply from the receiver device 703 is received then the L8RCall Server 702 proceeds to generate one or more alerts in step 755. Within an embodiment of the invention this alert may be transmitted as a formatted reply 790D therein allowing the user to establish an alternate communications route to the recipient, such as described within WO/2014/067,974 entitled "Methods and Systems for Delayed Notification in Communication Networks" by the inventors. Alternatively, the alert may contain other information such as delivery information as described in respect of second screen image 1500B in FIG. 15.

When a raw reply 790C is received then the L8RCall Server 702 looks also to detect whether a hit at an appropriate URL occurs in step 755. The L8RCall Server 702 then a browser window for the URL is opened acknowledging receipt of the reply, formats the reply and sends to the sender a formatted reply 790D. Where a message is received and no appropriate URL hit detected in step 750 then the L8RCall Server 702 sends a prompt to the recipient.

Figure 8:
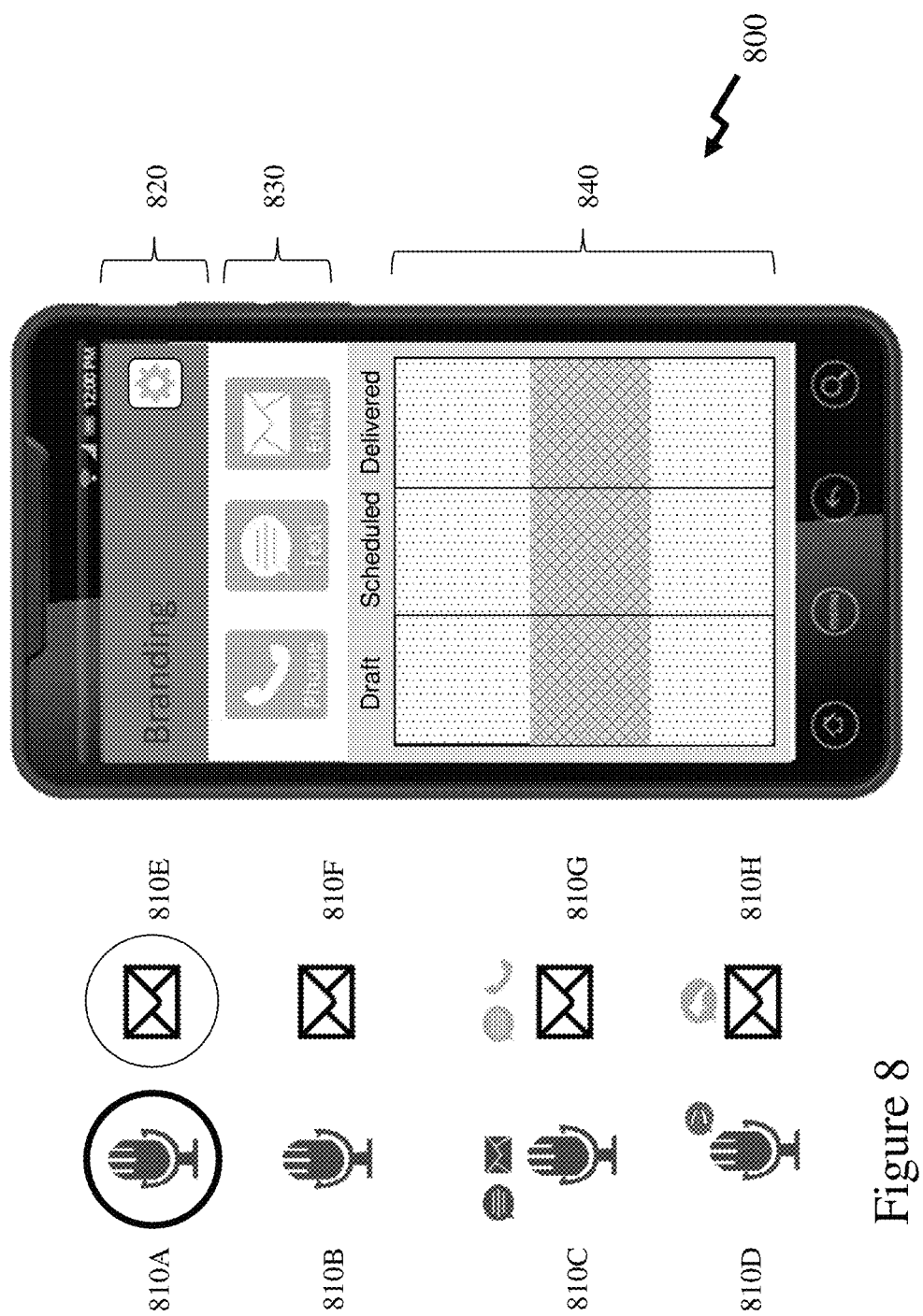
FIG. 8 depicts a visual language employed together with a visual flow format within a messaging system according to an embodiment of the invention.

Referring to FIG. 8 there are depicted first to eighth elements 810A to 810H of a visual language employed within an embodiment of the invention. As depicted first to fourth elements 810A to 810D relate to voice based messages and fifth to eighth elements 810E to 810H relate to an email message. Within the visual language there is a grammar which allows for an intuitive language for the user. Such a grammar may, for example, be that a solid line in relation to an element or content indicates that the item or content is editable whilst no line indicates that the item or content is not editable. Based upon this grammar first and fifth elements 810A and 810E by virtue of the solid line rings are indicated as being editable by the user whilst second and sixth elements 810B and 810F without solid line rings indicate that the elements are not editable, e.g. because the message has been delivered. Third and seventh elements 810C and 810G have alert modifiers associated with the elements indicating that secondary messages have been sent whilst fourth and eighth elements 810D and 810H have reply modifiers indicating that the recipient has replied.

Screen image 800 defines a visual flow format within a messaging system according to an embodiment of the invention. As depicted a header portion 820 provides branding and consistent access to features such as tools, help, etc. Within message bar 830 the user can generate voice, text (SMS) and email messages within the messaging system wherein these are visually presented in message window 840 wherein messages "flow" from left to right as the user drafts, schedules delivery, and then the messages are delivered. Optionally, a fourth replied bar may be provided as may others within alternate embodiments of the invention. As noted with first to eighth elements 810A to 810H respectively the visual language can be employed to provide the user with information quickly as to a message being editable or not whilst their visual positioning indicates their status in the overall process. Accordingly, with a quick visual the user is presented with significant information volume concerning their activities within the messaging system according to embodiments of the invention.

Figure 9:
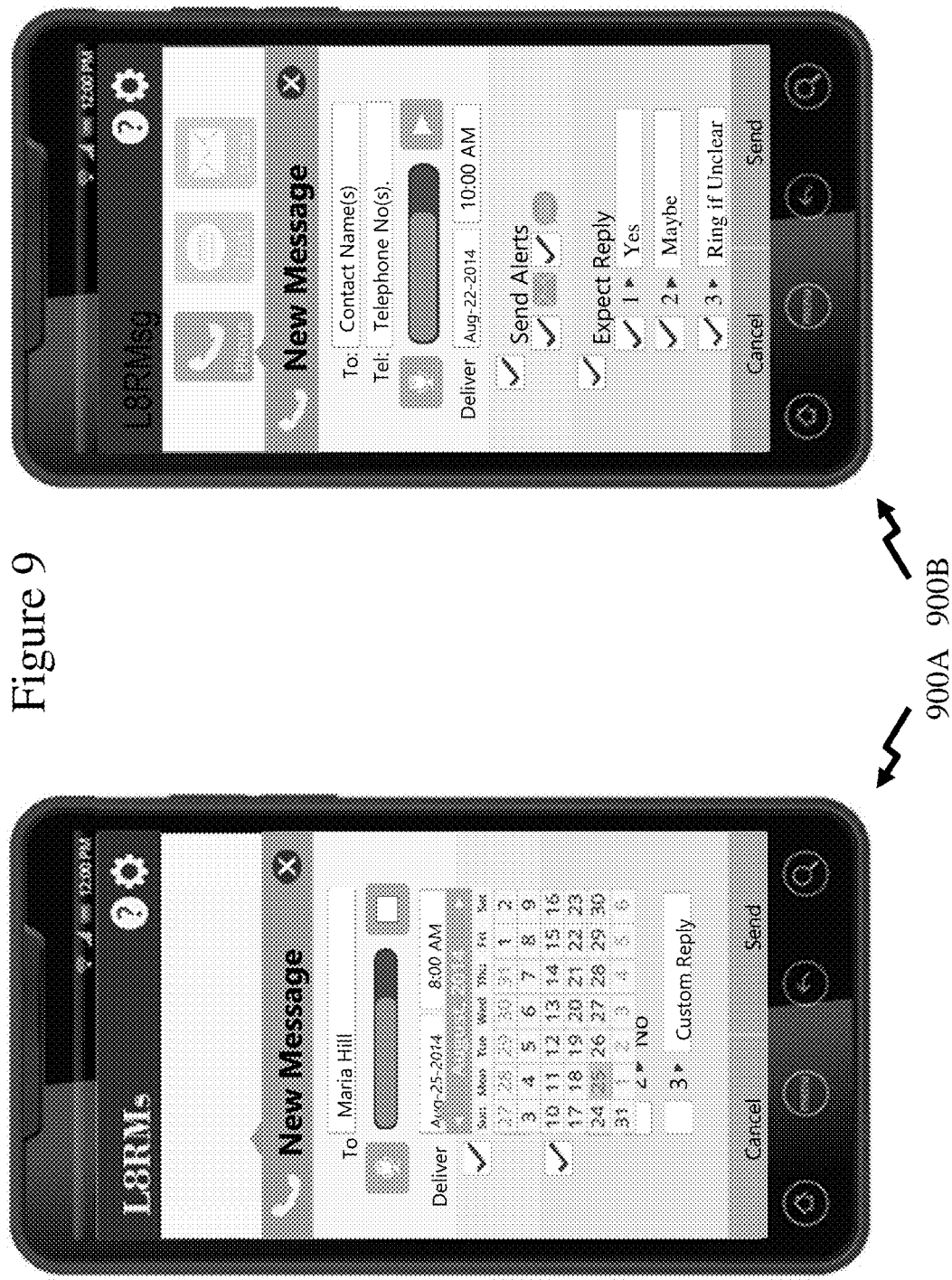
FIGS. 9 and 10 depict exemplary screen images of a software application according to an embodiment of the invention during the creation of a voice message.
Figure 10:
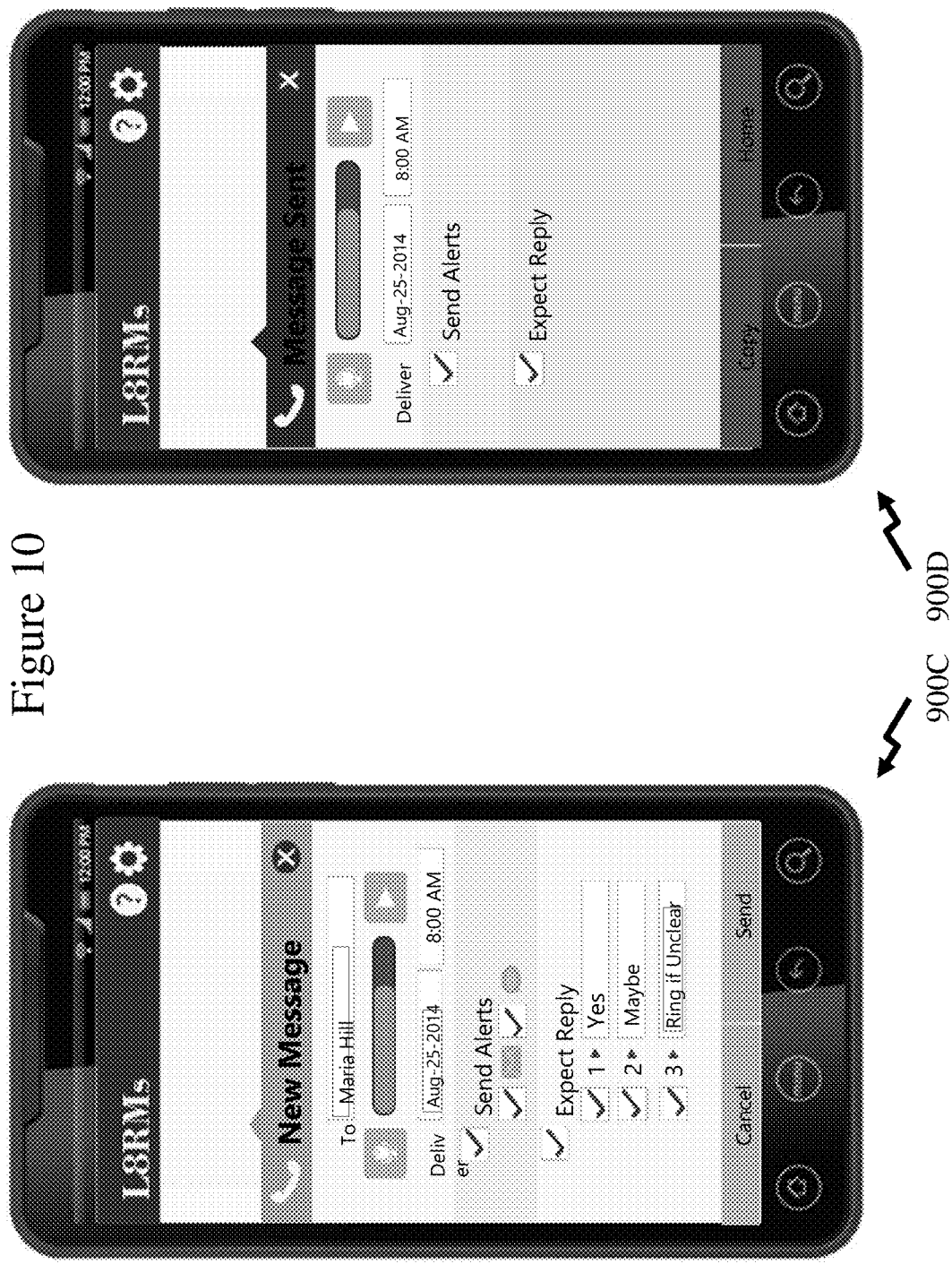

Now referring to FIGS. 9 and 10 there are depicted first to fourth exemplary application screen images 900A to 900D for a software application according to an embodiment of the invention supporting a messaging system according to an embodiment of the invention during the creation of a voice message. Referring to first exemplary application screen images (EAST) 900A within the message bar the user has selected "Phone" wherein the messaging system proceeds to execute a process flow such as described in respect of FIG. 6. As such the user is depicted establishing through a calendar function the delivery date for the voice message and may through a similar pop-out dialog box enter the time. Absent an entry by the user the system may default to a predetermined time set by the messaging system or a default established by the user. For example, a system default might be 06:00 am. As depicted in second EASI 900B the user also selects the name of the recipient and optionally, where the recipient has multiple telephone numbers the number to be used otherwise this field may be auto-populated. The user can select multiple recipients. A visual representation of the message is also provided together with record and play icons allowing the user to record (and re-record) the message and listen to it prior to transmission.

Additionally, the user may select to send alerts where options for the alerts may be defaults of the messaging system, defaults of the user, or defaults based upon the recipient, sender device, etc. The second EASI 900B also includes the ability for the sender to set key options such as expecting a reply, wherein they may establish a "1" as a "Yes", "2" for "No", and "3" to a custom option such as contacting a third party, for example. Optionally, the user may be presented with a scroll-down list/pop-up window with options for the fields including an "Other" which when selected allows the user to free format the entry. Upon the recipient playing the voicemail message if they hit the "1" key they will be able to record a reply which is communicated back to the sender by the messaging system. Alternatively, if the user selects "2" then no message is recorded but the software application communicates from the recipient device to the server such that the accessing of the message is logged. If other options have been provided, these may be selected and the appropriate process steps performed. Once completed the user may select "Send" to transmit the message to the messaging system server, e.g. L8RCall Server. Accordingly, third and fourth EASI 900C and 900D depict a message screen once ready for sending and upon being sent. As evident the user in preparing the message for "Maria Hill" to be delivered "Aug. 25, 2014" and "08:00 am" has provided three options to the user of "1=Yes", "2=Maybe", and "3=Ring if Unclear." Also in fourth EASI 900D button options "Cancel" and "Send" are replaced with "Copy" and "Home" allowing the user to either copy the message in order to send it to another recipient by amending elements or navigate back to the home page of the messaging system. In all of the first to fourth EASI 900A to 900D the message bar has the phone icon prominent and other supported options such as text and email semi-hidden.

Figure 11:
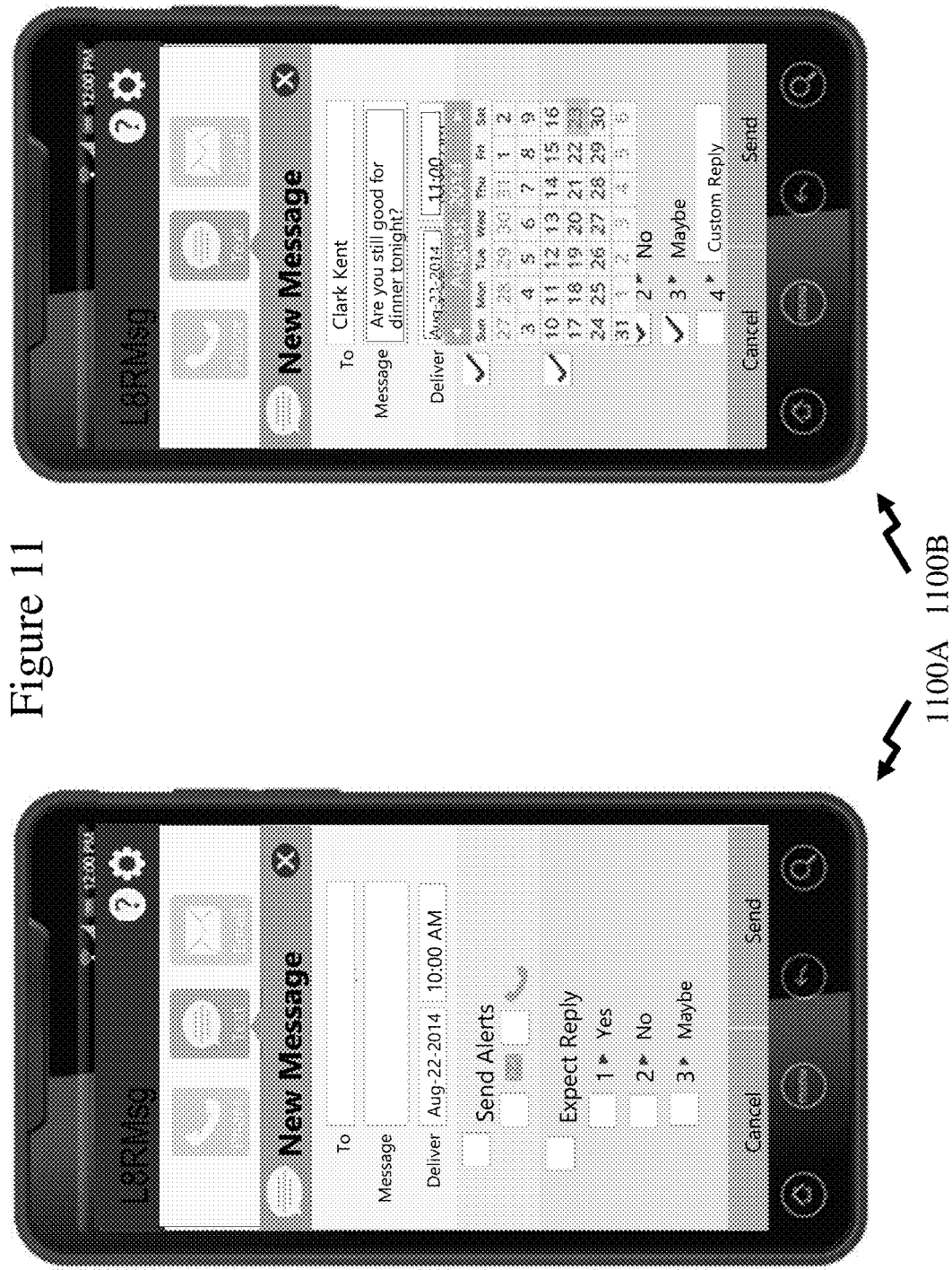
FIGS. 11 and 12 depict exemplary screen images of a software application according to an embodiment of the invention during the creation of a text message.
Figure 12:

Now referring to FIGS. 11 and 12 there are depicted first to fourth exemplary application screen images (EASIs) 1100A to 1100D for a software application according to an embodiment of the invention supporting a messaging system according to an embodiment of the invention during the creation of a text message. Referring to first exemplary application screen images (EAST) 1100A within the message bar the user has selected "Text" wherein the messaging system proceeds to execute a process flow such as described in respect of FIG. 5. As such the user is depicted as establishing the new message in first EASI 1100A wherein they are presented with fields relating to:

- To: allowing selection through menu or entry through typing of the recipient(s);
- Message a field wherein the user selects and then types their message to the recipient(s);
- Deliver wherein the user establishes a time and date for delivery of the message;
- Send Alerts wherein the user can select whether alerts should be sent by other means, e.g. email or phone; and
- Expect Reply does the sender expect a reply and if so what are the responses that will be provided to the recipient(s) via prompt(s).

Accordingly, in second EASI 1100B the user is entering a date through a pop-up calendar option where this date is the date for sending the message. Referring to third EASI 1100C it is evident that the user has entered to whom the message is intended and a message body as well as selecting one or more means of alerts and expected replies. These being:

1=Yes
2=No
3=Maybe

Referring to fourth EASI 1100D the button options "Cancel" and "Send" within first and third EASI 1100A to 1100C respectively are replaced with "Copy" and "Home" as fourth EASI 1100D depicts the screen presented to the user after selecting the "Send" option. Accordingly, "Copy" allows the user to copy the message in order to send it to another recipient by amending elements. If the user selects "Send Alerts" or "Expect Reply" then these pop-open to depict the options the user had selected. During the "Copy" process the user may amend the options under "Send Alerts" and "Expect Reply." In other embodiments the user may have limited options to amend selections for forwarding/copying/replying messages or their options previously selected may be removed completely or selectively removed.

Figure 13:
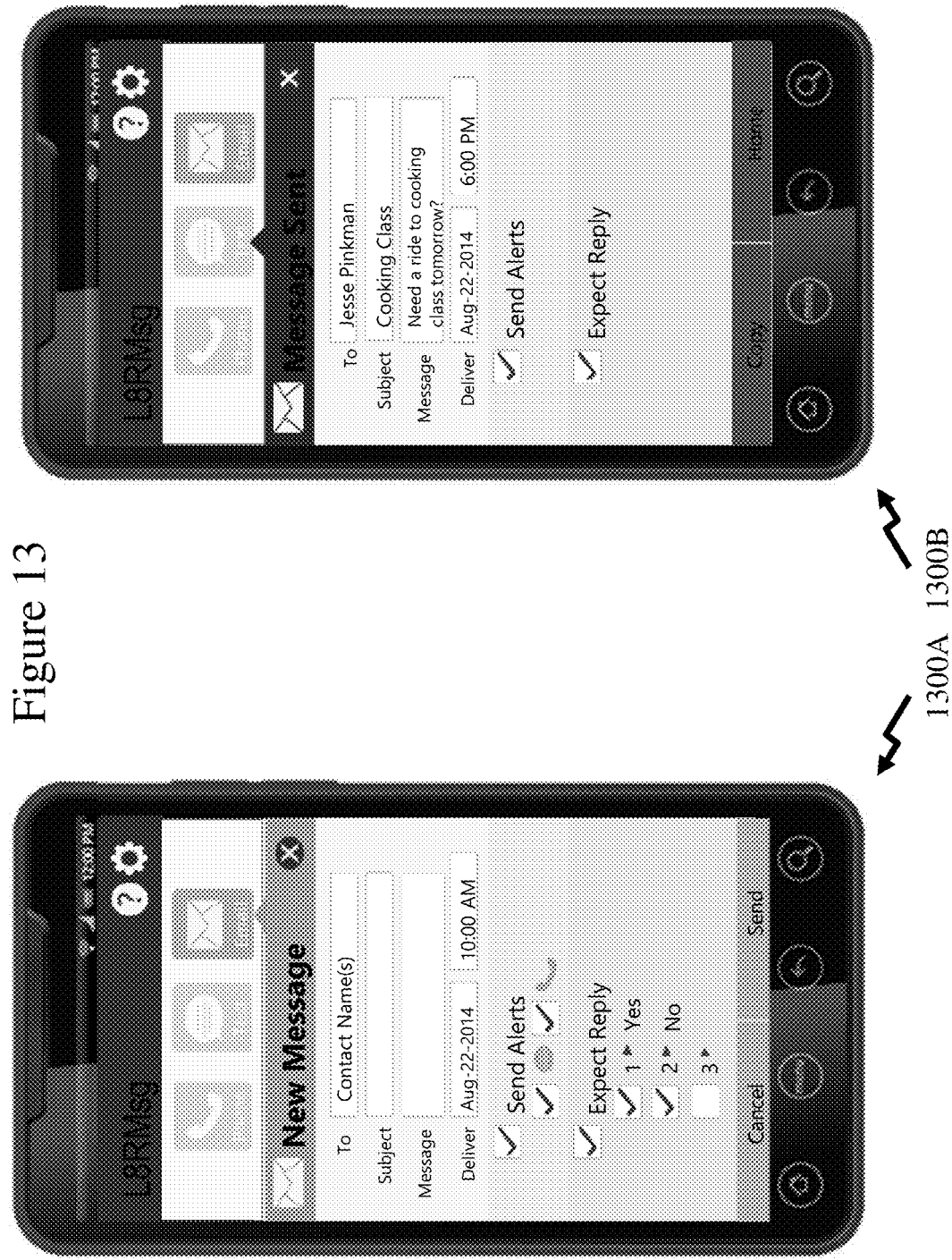
FIGS. 13 and 14 depict exemplary screen images of a software application according to an embodiment of the invention during the creation of an email message.
Figure 14:
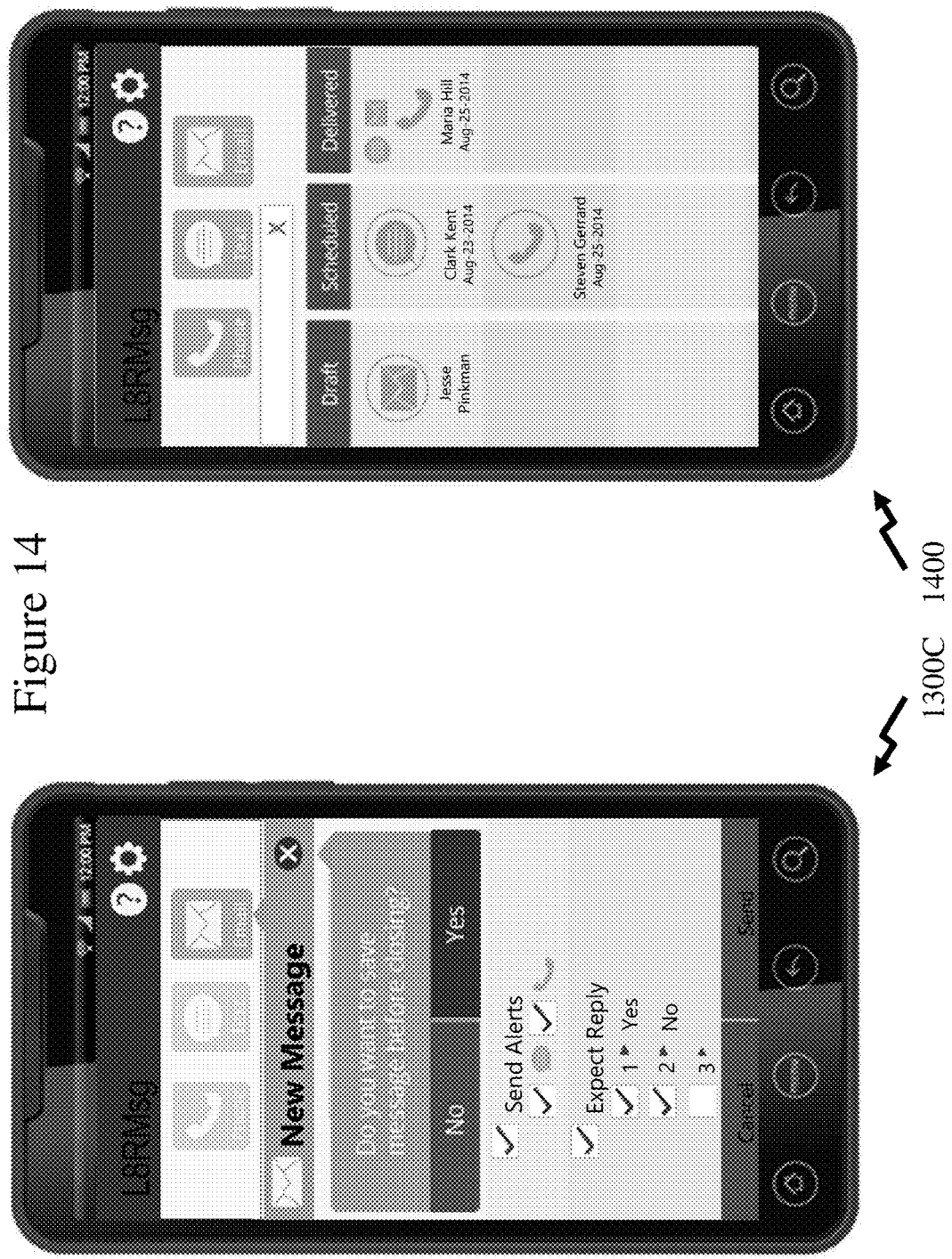

Now referring to FIGS. 13 and 14 there are depicted first to fourth exemplary application screen images (EASIs) 1300A to 1300C for a software application according to an embodiment of the invention supporting a messaging system according to an embodiment of the invention during the creation of an email message. Referring to first exemplary application screen images (EAST) 1300A within the message bar the user has selected "Email" wherein the messaging system proceeds to execute a process flow such as described in respect of FIG. 7. As such the user is depicted as establishing the new message in first EASI 1300A wherein they are presented with fields relating to:

- To: allowing selection through menu or entry through typing of the recipient(s);
- Subject wherein the user can enter a subject for association with the message and subsequently grouping of messages, replies etc. by the subject;
- Message a field wherein the user selects and then types their message to the recipient(s);
- Deliver wherein the user establishes a time and date for delivery of the message;
- Send Alerts wherein the user can select whether alerts should be sent by other means, e.g. email or phone; and
- Expect Reply does the sender expect a reply and if so what are the responses that will be provided to the recipient(s) via prompt(s).

Second EASI 1300B depicts the screen presented to the user once they have selected the "Send" option whereby the "Cancel"/"Send" options are replaced with "Copy" and "Home." If the user elects to select the "Cancel" option during generation of a message, including phone and text message options, the user is presented with images similar to third image 1300C allowing the save the message before closing or cancel without saving.

Now referring to exemplary application screen images (EAST) 1400 there is depicted a user screen presented to the user during use of the messaging system wherein they are able to track the status of their various messages within a single application and through a single interface. Accordingly, as depicted the user is presented with a columnar format with formats of "Draft", "Scheduled", and "Delivered." Within each column icons using the visual language are presented for each message the user creates, sends, etc. As such the user can immediately see that they have messages scheduled as well as in draft plus importantly that the delivered voicemail message to "Maria Hill" has now progressed to the point that alerts have been triggered. This is further extended in first EASI 1500A in FIG. 15 wherein the visual language now indicates that "Maria Hill" has replied. If the user selects the message from "Maria Hill" at this point then a delivered message pop-up window appears as depicted in second EASI 1500B in FIG. 15 wherein the user can play the reply voicemail as well as see the full history of the message which indicates it was delivered at 1:00 pm, a text prompt message was sent at 1:10 pm, an email prompt message was sent at 1:20 pm and the recipient replied at 1:42 pm. If the message had been a text or email then the opening action would rather than providing a play option would display the entire message or part of the message according to the message length and the window dimensions.

Figure 16:
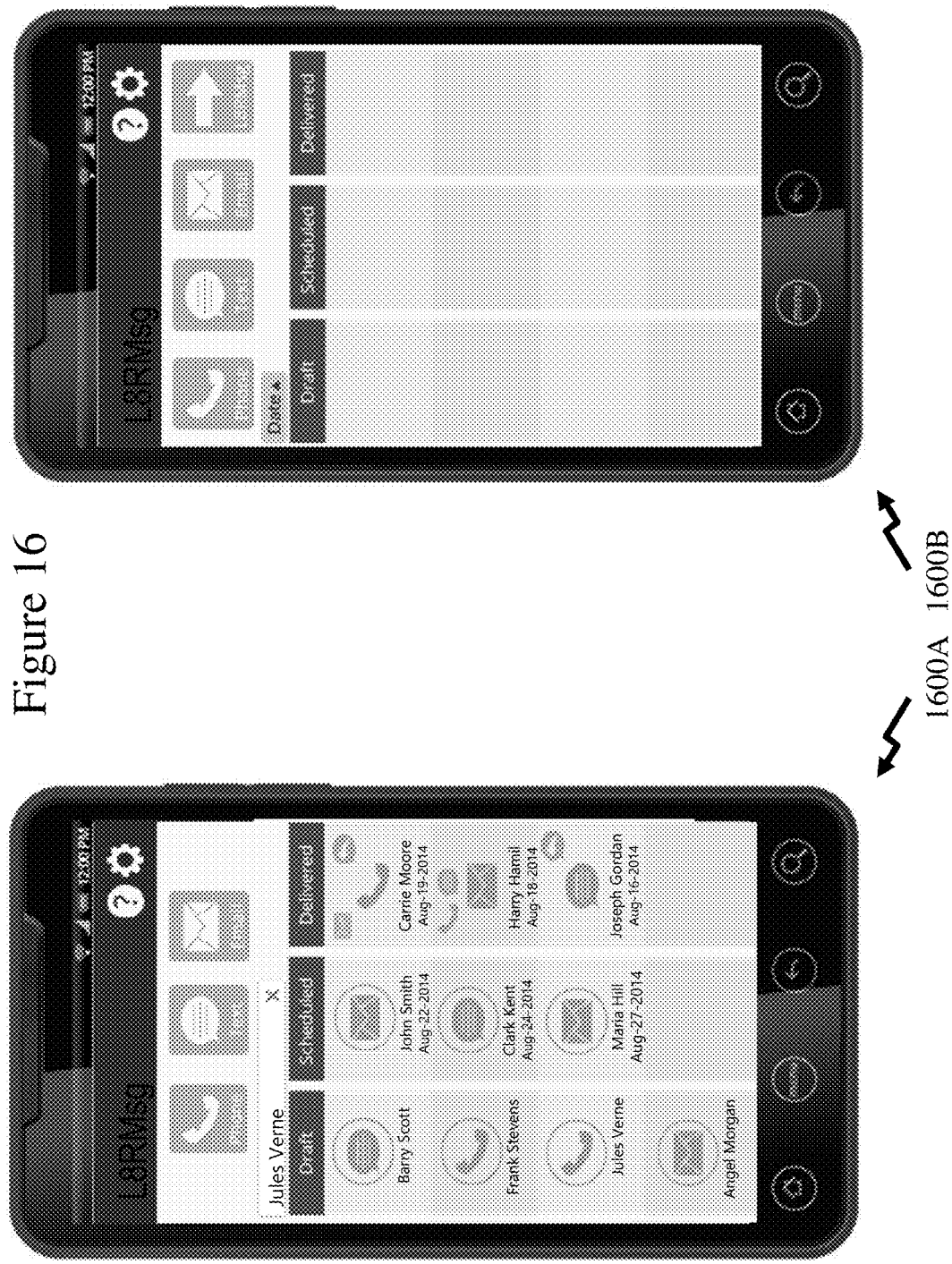

Referring to FIG. 16 in first EASI 1600A the visual flow format of the messaging system and visual language are again evident together with a search field. In addition to allowing the user to search for specific recipients the search feature may provide the user with the ability to filter based upon alerts, prompts, replies, outstanding messages etc. Some users, e.g. those with a premium membership of the messaging system, may access additional features, such as through an extension icon as depicted with the "L8RMsg" icon in second EASI 1600B. As evident in first EASI 1700A in FIG. 17 advanced features may include additional alert options, alert timing options, repeat options, etc. as well as allowing the establishment of additional features such as geo-location wherein the location of the recipient is included within any reply or provided back upon message delivery.

Figure 17:
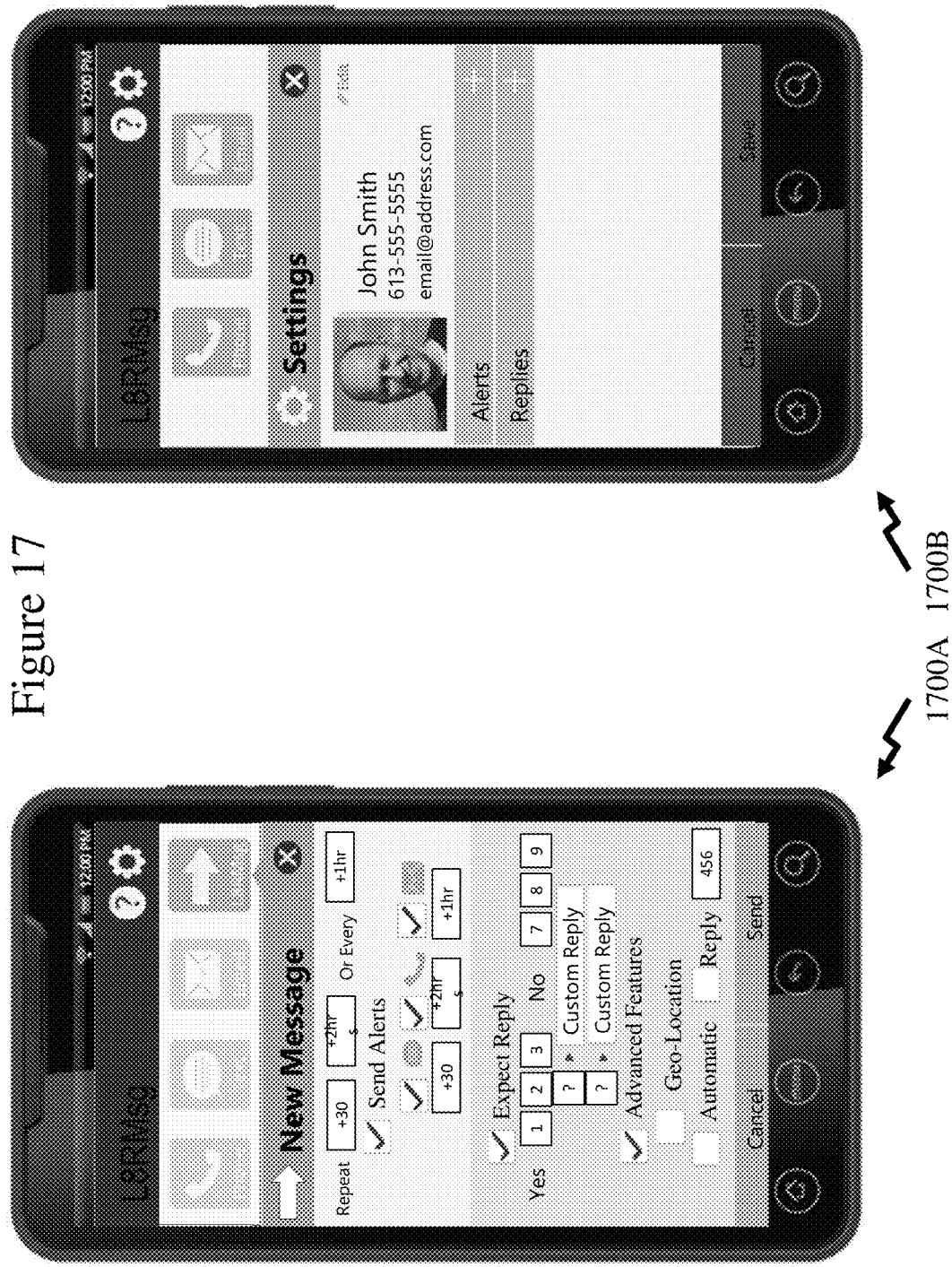
FIG. 17 depicts exemplary screen images of a software application according to an embodiment of the invention advanced feature access and user setting aspects.

As depicted in first EASI 1700A in FIG. 17 the user is now provided with:

- Repeat timing options such as different offsets from original delivery or repeated delivery;
- Alert timing options allowing the timing and hence order of alerts;
- Reply key options allowing the user to establish multiple keys for standard options such as Yes and No in addition to configuring additional reply options that may be presented within menu rather than the user having to add these for each message; and
- Advanced features such as geo-location wherein the feature can be enabled and then established as being automatically provided or provided based upon user key entry.

A user may upon registering with the message service, as part of the terms of agreement they accept, grant access to their location information automatically. Optionally, the location information selection may be restricted to specific sender accounts such as immediate family, emergency services, employer, etc.

Using the advanced features therefore a sender may contact a recipient with the message "Is everything OK" wherein the recipient may select "1" as indicated to provide a "Yes" response and then a "4" as indicated to provide authorization to transmit their location information where their acceptance of providing geo-location information is not automatic to all accounts. Optionally, the location may be a "Send Location" button for example within a text or email message. When the sender receives the reply they can see the positive reply and be advised that coordinate information was provided or be provided with a map indicating the location of the recipient wither discretely or in relation to the sender. Within other scenarios these features may allow, for example, security guards who have to check in on a regular basis, e.g. hourly, to provide a reply indicating that all is OK and either automatically or under prompting provide their response. Alternatively, a mother contacts their child, "are you home from school", wherein the child responds and irrespective of their reply their location information is provided to the mother. Within another option, a user may contact a friend, "Are you on your way over", wherein when the friend responds with "Yes" through the simple key stroke option they also elect to send their location to show how far away they are.

Optionally, the geo-location information may be processed to provide alternate data to the sender based upon their location and the recipient's location. For example, the geo-location data of the recipient may be parsed through a mapping tool to generate approximate timing data relating to the recipient's estimated arrival time. Such mapping tools today, e.g. Google Maps, by virtue of acquiring traffic data can provide time data based upon current traffic information, road closures, etc.

Figure 18:
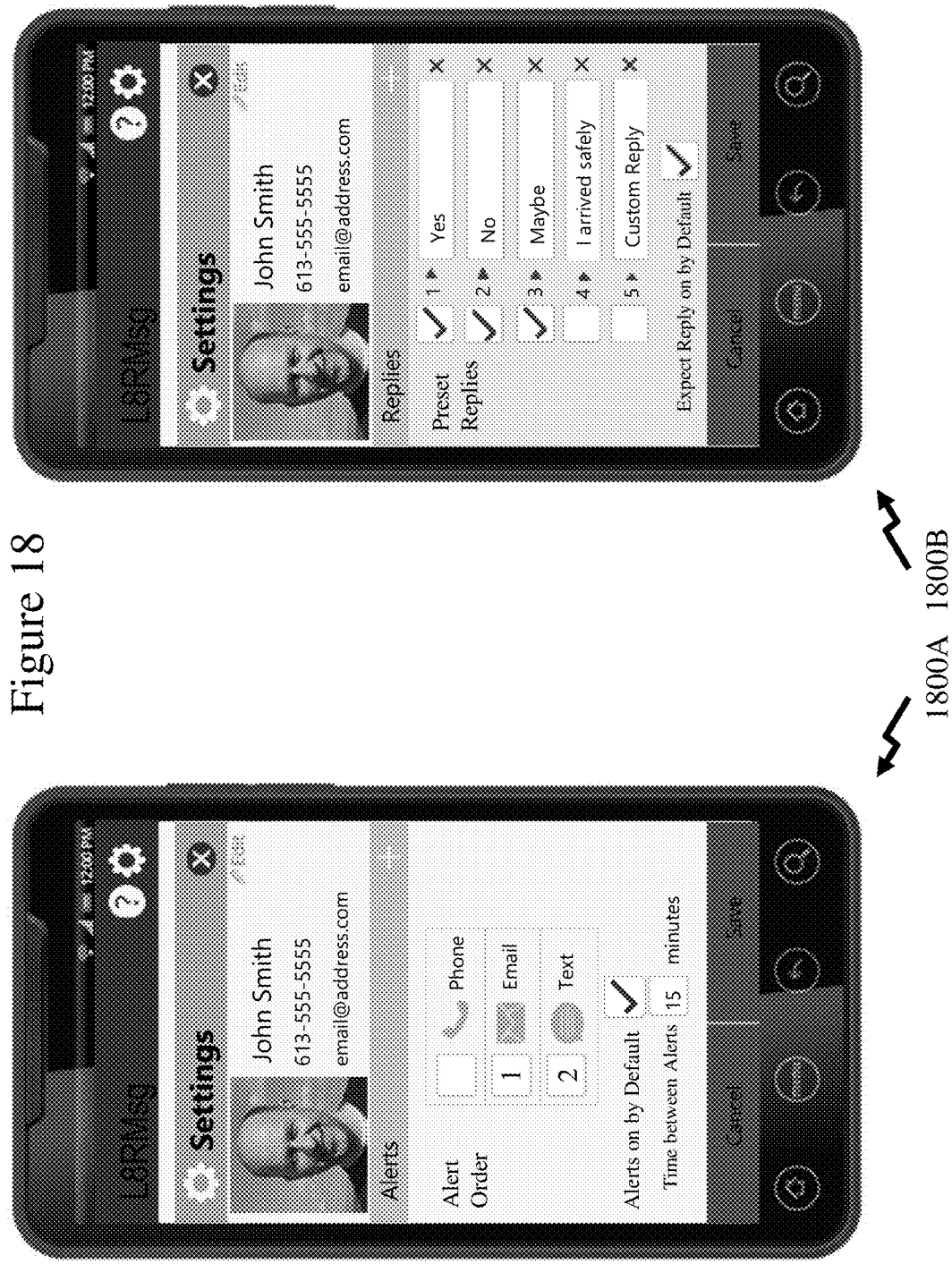
FIG. 18 depicts exemplary screen images of a software application according to an embodiment of the invention relating to user setting aspects.

Advanced messaging features as well as standard messaging features may be configured by the user through a settings screen and menu options such as depicted in second EASI 1700B in FIG. 17. For example, within alerts as depicted in first EASI 1800A in FIG. 18 the user may establish the order in which alerts are sent, e.g. email first followed by text, the timing between alerts, and whether alerts are on by default. Similarly, in second EASI 1800B in FIG. 18 the user can establish the presets for replies such as "1=No", "2=Yes", "3=Maybe", and "4=I arrived safely" and for options 1 to 3 to be present when drafting a message.

Figure 19:
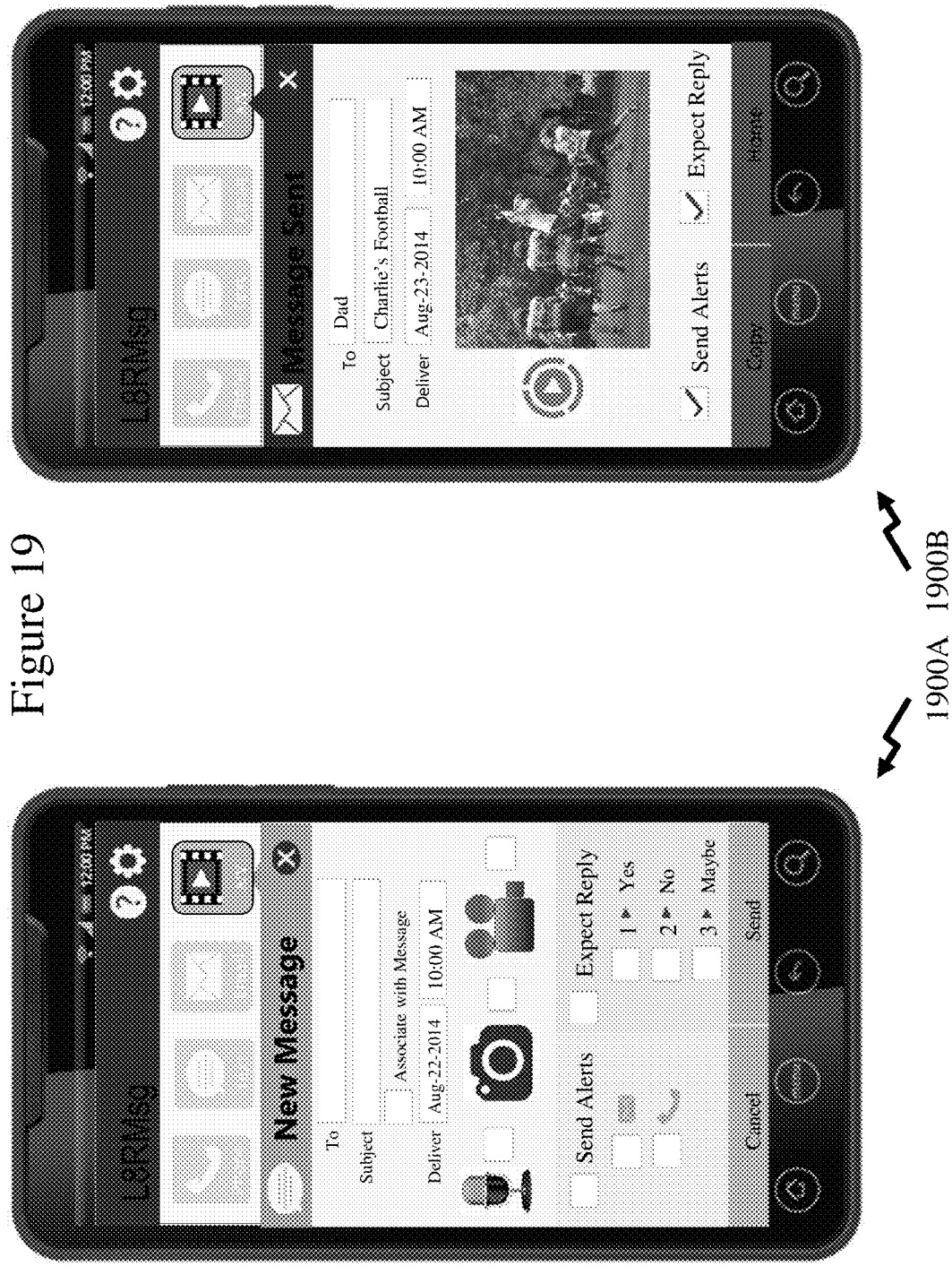
FIG. 19 depicts exemplary screen images of a software application according to an embodiment of the invention during the creation of a video and/or image message.

Now referring to FIG. 19 depicts exemplary first and second screen images 1900A and 1900B for a software application according to an embodiment of the invention during the creation of a video and/or image message. Accordingly, the creation of a video and/or image message or the incorporation of a video and/or image within a message may progress according to a process flow similar to those described above in respect of FIGS. 4 to 18 above. Accordingly, a user may be presented with the audiovisual (AV or A/V) option as standard or as part of an extended message set according to a subscription level of the user. As depicted in first screen image 1900A the user may select the normal options in terms of sending alert(s), expecting reply(ies), and establishing the time/date for the delayed message to be sent. The user may select a voicemail, an image (photograph) and/or video to send. In second screen image 1900B the user has sent a message embedding a video which is timed for delivery at a later date/time.

It would be evident that the user may associate the delayed video/image/voicemail with a message through an option presented to them within first screen image 1900A. In this manner a user may establish a linked message set, for example as part of a marketing/advertising campaign or to reduce/separate emails for wireless delivery. For example, a user may generate a message, e.g. "The Next U2 Video will be Released @ 6:00 pm Tomorrow" and associate this with an A/V message established which subsequently delivers the video at 6:00 pm the next day. By linking the two messages are automatically associated with the same recipients with either common delivery addresses or separate addresses. For example, the message might be texted to the recipient, e.g. "Dad, sending you a message later of Charlie's football interception" and then send the video as another message to the recipients email address.

Figure 20:
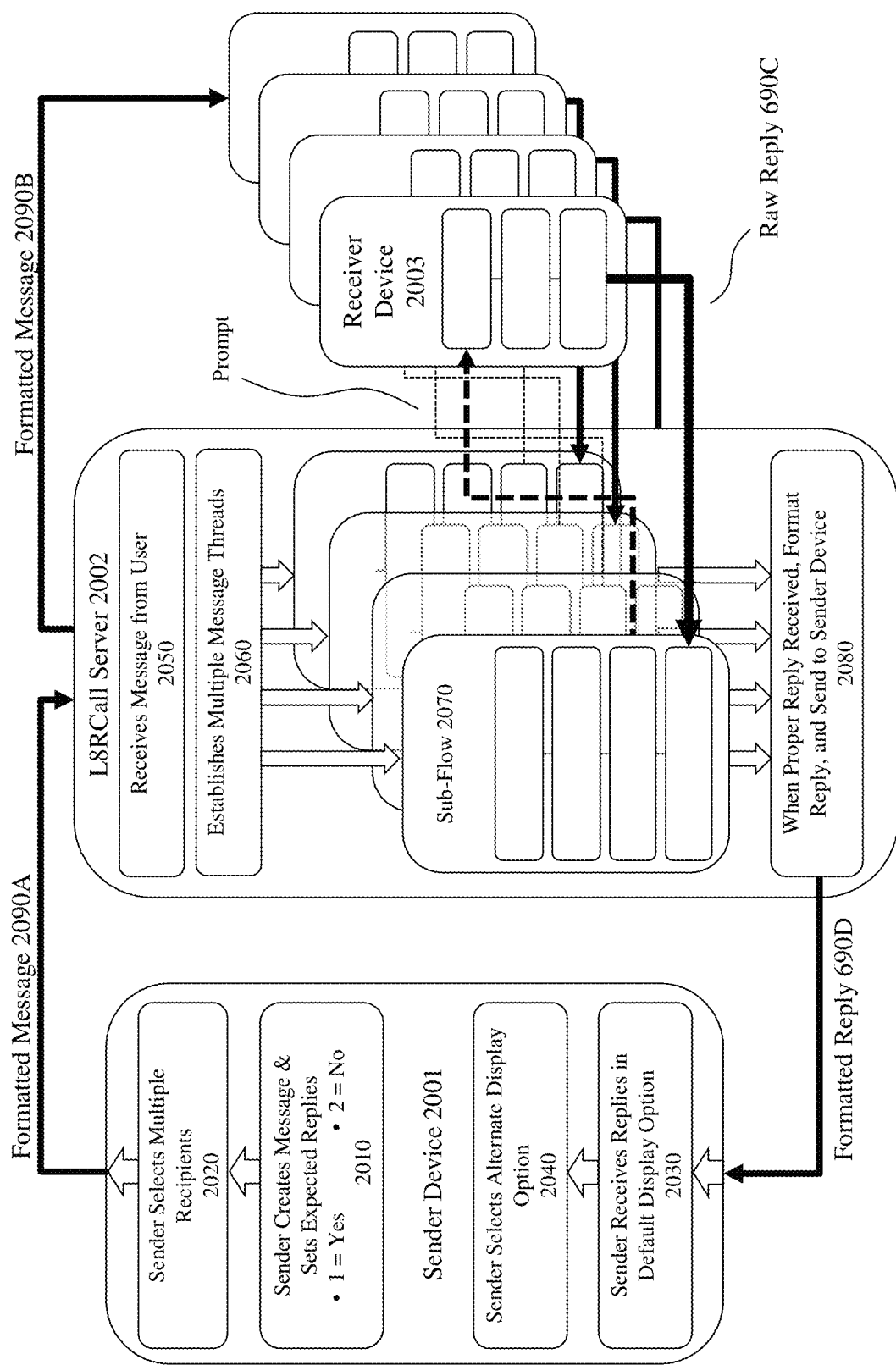
FIG. 20 depicts a detailed message process flow for a user sending a text message to multiple recipients according to an embodiment of the invention.

Now referring to FIG. 20 there is depicted a detailed message process flow for a user sending a text message to multiple recipients according to an embodiment of the invention from their sender device 2001, e.g. a PED or FED associated with a user wishing to send a message, via a server such as L8RCall Server 2002 to the recipients devices 2003, e.g. a PED or FED associated with a user for whom a message is intended. Accordingly, as depicted in step 2010 the user creates a message and as discussed above in respect of FIGS. 3 to 19 schedules a delivery time for the message. However, in addition to the message the user sets expected replies, e.g. "1=Yes" and "2=No." The user then selects the multiple recipients to whom they wish the message to be delivered to in step 2020. These together with the message are combined into first formatted message 2090A which is transmitted from the sender device 2001 to the L8RCall Server 2002. The L8RCall Server 2002 receives the message from the user in step 2050 and then establishes multiple message threads in step 2060 where each thread is associated with one of the recipient telephone numbers and has an associated sub-flow 2070.

Each sub-flow 2070 represents the equivalent steps to steps 525 to 540 in FIG. 5 wherein each sub-flow 2070 tags the sender, the receiver phone number, and then allocates a sequence number such that multiple messages to the receiver can be tracked separately when the recipient replies. Next the sub-flow 2070 schedules and delivers the message to the recipient's receiver device 2003. If a reply is received from the recipient via their receiver device 2003 then the sub-flow checks to determine if it is a valid reply or if an incorrect reply notify the recipient it is invalid. If no reply has been received by the time limits set by the sender then the sub-flow 2070 sends any prompts as discussed and described supra.

When a proper reply is received the L8RCall server 2002 in step 2080 processes it and formats it for subsequent transmission to the sender device 2001 wherein it is displayed to the user according to the settings of the user's application in execution. As depicted below in respect of FIG. 22 this may include summary formats where the number of recipients is large to make tracking the replies easier than a series of individual messages. Accordingly, in step 2080 the L8RCall server 2002 may store received replies and provide periodic updates to the user rather than when every reply is received.

Figure 21:
FIGS. 21 and 22 depict exemplary screen images of a software application according to an embodiment of the invention for a user sending a text message to multiple recipients according to an embodiment of the invention.
Figure 22:

Now referring to FIGS. 21 and 22 there are depicted exemplary screen images of a software application according to an embodiment of the invention for a user sending a text message to multiple recipients according to an embodiment of the invention. Referring initially to FIG. 21 there are depicted first and second exemplary screenshots 2100A and 2100B respectively. Within first screenshot 2100A the user is creating a message for delivery to multiple recipients wherein the software application in execution upon the user's PED, for example, upon detecting multiple recipients provides in addition to the message creation data described and depicted supra, for example first screenshot 100A in FIG. 11, in respect of message, delivery data, alters, expected replies etc. also present the user with the options for replies of "Solo", wherein each recipient's replies are automatically parsed and pushed to the user's electronic device, or "Collate" wherein the user can select a frequency of updates, e.g. hourly, daily, etc. Accordingly, in second screenshot 2100B the message sent display to a user having sent a message via the L8TR server is depicted indicating the recipients, subject, message, delivery timing information, whether alerts have been requested, whether replies expected and the deadline for the message. Optionally, an indication of collation format may also be presented. Selection of items such as alerts, expected reply etc. may trigger pop-ups that display additional details relating to these aspects of the message as established by the user.

Now referring initially to FIG. 22 there are depicted first and second exemplary screenshots 2200A and 2200B respectively in respect of display formats to the user for messages sent with multiple recipients. In first screenshot 2200A the user has selected a "summary" option wherein received message, perhaps their daily collation, indicates the subject, the delivery and deadline timing information, alert timing information and then the status of the recipients. In this instance the user is provided with the information that 16 unique recipients were sent the message, there were no failures, that 5 replied yes, 2 replied no, 2 were don't know and that 7 have yet to respond (if the viewer is looking prior to the deadline) or that 7 did not respond (if the viewer is looking after the deadline). In second screenshot 2200B the user is presented with the replies in an alternate format wherein they can now see the responses by recipient.

It would be evident to one skilled in the art that the presets may be a single key (button) or they may alternatively be two keys, three keys or more. For example, "12=No" and "78="Yes" or "312=No" and "978=Yes" such that accidental replies are reduced as two key strokes/selections or more are unlikely. Alternatively, they may be words, e.g. type NO or e.g. YES but the keystrokes are noted and trigger the action rather than the text being captured and sent. Alternatively, voice recorded replies may be analysed for key word(s) e.g. "I WILL=Yes" or a positive response or "No Way=No" or a negative response.

It would be evident to one skilled in the art that within embodiments of the invention the generation of, for example, a voicemail may be undertaken as a process wherein the user generates a written message which is then converted to a voicemail message or that a voice message may be converted to a text, SMS, or email message, for example, according to preferences of the user as established through their configuration/settings. Accordingly, their initial message may be automatically converted through such processes in generating each prompt subsequently. It would be further evident that such conversions may also occur at the recipient side upon receipt of an initial message but may be disabled for prompts. Such occurrences may, for example, allow for a disability of the user and/or contact or relate to aspects of the FED/PED upon which the communication is sent and/or received.

It would be evident that the storage of messages prior to delivery to the user may be performed on the contacts PED/FED such that delivery to their PED/FED is achieved but actually delivery notification to the contact is not performed until the allotted time set by the user. It would be further evident that the messaging system described above in respect of FIGS. 4 to 19 may be provided as a discrete application for installation upon user PEDs/FEDs or that the messaging system may be embedded as part of another application and/or software application such as a SOCNET, email application, etc.

It would be evident to one skilled in the art that the embodiments of the invention relate to systems providing for the generation and reception of messages in one or more formats, including but not limited to, email, SMS, text, and voicemail. Such embodiments of the invention are essentially independent of the network over which the messages are communication and hence may include one or more additional wireless or wired interfaces/elements operating according to one or more standards which may be selected from the group comprising IEEE 802.11, IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, IMT-2000, DSL, Dial-Up, DOCSIS, Ethernet, G.hn, ISDN, MoCA, PON, Power line communication (PLC), and Cable TV. Wired interfaces may be further one or more of twisted-pair copper, coaxial cable, singlemode or multimode fiber optic and multimode fiber optic.

It would be evident therefore be evident that embodiments of the invention may be implemented as part of existing or future communications systems and the software upon their associated PEDs/FEDs or that they be implemented as one or more standard alone software applications that may also be employed on electronic devices. It would also be evident that such software applications installed and/or operating on the electronic devices may communicate to a software system in execution upon remote servers such that communications relating to applications for the user are parsed by the remote server based software system so that notifications can be provided to the user.

It would be evident to one skilled in the art that the concepts discussed above in respect of software applications and communications whilst being primarily considered from the viewpoints of tablet computers, smart phones, laptop computers and similar communications based portable electronic devices that the underlying principles may be applied to a wider variety of devices including for example portable gaming consoles, such as Nintendo DS and Sony PSP; portable music players such as Apple iPod, and eReaders such as Kobo, Kindle, and Sony Reader. It would also be evident that whilst the embodiments of the invention have been described with respect to a standalone application that they may also be employed within software applications that form part of an operating environment such as Windows, Mac OS, Linux and Android for example.

It would be further evident that the messages to/from the receiver's PED/FED and from/to the sender's PED/FED may be transmitted through a remote server executing a software system and/or software application according to an embodiment of the invention wherein activities such as determining characteristics of the message send to the contact, receiving data relating to the contact's accessing of the message, and determining analytics of the message relating to the contact's access of the message may be performed by the remote system rather than at the end point PEDs/FEDs of the user and contact.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other mediums capable of storing, containing or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alphanumeric input unit such as a keyboard, a pointing control device such as a mouse, and so forth.

The memory includes machine-readable code segments (e.g. software or software code) including instructions for performing, when executed by the processing system, one of more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method comprising:
   creating, by a sender, a formatted message to be transmitted to a recipient upon a server; and
   providing to the recipient at a delivery time the formatted message from a sender with a series of options, each option of the series of options comprising a predetermined sequence of buttons to be selected by the recipient to provide an expected reply to the message sender, wherein
   each option and its predetermined response are provided to the recipient as part of the formatted message from the sender;
   the server executes a first process and a second process;
   the first process for providing the formatted message as an email message and comprises the steps of:
      receiving a first formatted message from a sender device associated with the sender where the sender device associated with a sender device identity and the first formatted message comprises a message created by the sender, the delivery time for the message, a recipient device identity associated with the recipient and expected replies established by the sender;
      tagging the sender and recipient device identities;
      allocating a sequence number to the message to be transmitted to the recipient where the sequence number allows multiple messages to the recipient to be tracked separately when the recipient replies;
      allocating a Uniform Resource Locator (URL) to each expected reply within the expected replies;
      establishing a second formatted message comprising the message created by sender and the URL links associated with the expected replies; and
      transmitting the second formatted message as the formatted message to a receiver device associated with the recipient device identity at the delivery time;
   the second process for providing the formatted message as text message or a voice message and comprises the steps of:
      receiving a first formatted message from a sender device associated with the sender where the sender device is associated with a sender telephone number and the formatted message comprises a message created by the sender, a delivery time for the message, a recipient telephone number associated with the recipient, and expected replies established by the sender;
      tagging the sender and recipient telephone numbers;
      allocating a sequence number to the formatted message to be transmitted to the recipient where the sequence number allows multiple messages to the recipient to be tracked separately when the recipient replies;
      establishing a second formatted message comprising the message created by sender and prompts where the prompts are the expected replies established by the sender; and
      transmitting the second formatted message to a receiver device associated with the recipient telephone number as the formatted message at the delivery time; and
   each prompt associated with an expected reply comprises a predetermined sequence of buttons.

2. The method according to claim 1, wherein
   when the server executes the first process it also executes a third process comprising:
   receiving a raw reply from the recipient device generated on selection of a URL by the recipient;
   detecting whether a hit at an appropriate URL occurs;
   upon determining a hit at an appropriate URL occurred opening a browser window for the appropriate URL acknowledging receipt of the reply;
   upon determining a hit at an appropriate URL occurred formatting the reply and sending the formatted reply to the sender; and
   upon determining no hit at an appropriate URL occurs sending a prompt message to the recipient.

3. The method according to claim 1, wherein
   when the server executes the second process it also executes a third process comprising:
   receiving a raw reply from the recipient device based upon the recipient device capturing a reply generated by the recipient comprising a selected sequence of buttons upon the recipient device;
   determining if the reply from the received from the recipient device matches an option of the series of options;
   upon a positive determination generating a formatted reply for transmission to the sender; and
   upon a negative determination sending to the recipient a prompt.

4. The method according to claim 1, further comprising
   creating by the sender when creating the formatted message a plurality of alerts to be sent to the recipient by the server absent a response from the recipient;
   each alert of the plurality of alerts is to be sent via a different communication channel established by the sender; and
   each alert of the plurality of the alerts is to be sent at a different predetermined time offset from the delivery of the formatted message where the different predetermined time offsets are set by the sender.

5. The method according to claim 1, further comprising
   the server executes a third process comprising:
   sending a plurality of formatted messages to a plurality of recipients using at least one of the first process and the second process in dependence upon the plurality of recipients being identified within a formatted message received from the sender comprising a message created by the sender, a delivery time for the message, and expected replies established by the sender; and
   transmits to an electronic device associated with the sender a summary with respect to the plurality of formatted messages which is rendered to the sender, the summary comprising:

a first indication of the number of recipients to whom the plurality of formatted messages were sent;
a second indication of the number of failed deliveries of the plurality of formatted messages;
a series of third indications each comprising an option of the series of options;
a series of fourth indications each comprising a total number of replies received from recipients selecting an option of the series of options and displayed in association with the third indication of the series of indications relating to the option of the series of options; and
a series of fifth indications each relating to one of the delivery time of the transmission of the plurality formatted messages, a deadline for a reply to be sent by a recipient, and a time of a subsequent alert to be sent to recipients who have not replied; wherein
the server associates the replies from recipients to the sender in dependence upon the sequence numbers associated with the formatted message sent to the recipients.

6. The method according to claim 1, further comprising the server executes a third process comprising:
sending a plurality of formatted messages to a plurality of recipients using at least one of the first process and the second process in dependence upon the plurality of recipients being identified within a formatted message received from the sender comprising a message created by the sender, a delivery time for the message, and expected replies established by the sender; and
transmits to the sender a summary with respect to the plurality of formatted messages, the summary comprising:
a series of first indications each comprising an identity of a recipient of the plurality of recipients;
a series of second indications each comprising a visual indication of a reply provided by the recipient of the plurality of recipients; and
a series of third indications each relating to one of the delivery time of the transmission of the plurality formatted messages, a deadline for a reply to be sent by a recipient, and a time of a subsequent alert to be sent to recipients who have not replied; wherein
the server associates the replies from recipients to the sender in dependence upon the sequence numbers associated with the formatted message sent to the recipients.

7. The method according to claim 1, wherein
the first formatted message is generated by the sender using a messaging software application in execution upon an electronic device associated with the sender; and
the messaging software application renders to the sender a user screen comprising a plurality of icons, each icon relating to a message of a plurality of messages the sender has in draft, scheduled and sent via email messages, text messages and voice messages wherein each icon is rendered using a visual language indicating in addition to at least one of the recipient and the delivery time whether one or more alerts associated with the message have been triggered;
upon selection of an icon associated with a message of the plurality of messages the user is presented with a window wherein the sender can view a full history of the message comprising the original delivery time, any sent alerts associated with the message, when the recipient replied, any expected replies, and either a portion of the recipients reply where the reply was received as an email message or text message or an icon to access a voicemail reply where the reply was received as a voicemail; and
each alert of the one or more alerts was created by the sender when creating the formatted message to be sent to the recipient by the server absent a response from the recipient via a different communication channel established by the sender and at a different predetermined time offset from the delivery time of the formatted message set by the sender.

8. The method according to claim 1, wherein
the series of options comprises standard reply options and additional reply options;
the predetermined sequence of buttons for each option within the series of options relating to a standard reply option of the standard reply options are either automatically established by a software application or automatically established in dependence upon presets established by the sender within the software application;
the predetermined sequence of buttons for each option within the series of options relating to an additional reply option of the additional reply options are established by the sender within the software application; and
the software application is in execution upon the sender device upon which the sender generates the first formatted message.

9. The method according to claim 1, wherein
the series of options comprises standard reply options and additional reply options;
the predetermined sequence of buttons for each option within the series of options relating to a standard reply are established by the sender within a software application;
the predetermined sequence of buttons for each option within the series of options relating to an additional reply option of the additional reply options are established by the sender within the software application; and
the software application is in execution upon the sender device upon which the sender generates the first formatted message.

10. The method according to claim 1, wherein
the sender when generating the first formatted message establishes an advanced feature which is included within the first formatted message;
the advanced feature triggers a software application to automatically include a geo-location of the recipient within a reply generated by the recipient;
the software application is in execution upon the receiver device upon which the recipient generates the reply; and
the geo-location is automatically included by the software application either for specific sender accounts of which an account of the sender is one or where the recipient has previously granted permission for their location information to automatically given.

11. The method according to claim 1, wherein
the sender when generating the first formatted message establishes an advanced feature which is included within the first formatted message;
the advanced feature triggers a software application to either automatically include a geo-location of the recipient within a reply generated by the recipient or include the geo-location within the reply generated by the recipient in dependence upon the recipient selecting a sequence of buttons associated by the sender with the advanced feature; and the software application is in execution upon the receiver device upon which the recipient generates the reply.

12. The method according to claim 1, wherein the sender when generating the first formatted message establishes an advanced feature;

the advanced feature triggers a software application to either automatically include a geo-location of the recipient within a reply generated by the recipient or include the geo-location within the reply generated by the recipient in dependence upon the recipient selecting a sequence of buttons associated by the sender with the advanced feature;

the geo-location is processed to provide alternate data to the sender based upon a location of the sender and the recipient's geo-location;

the alternate data s generated by parsing the geo-location data through a mapping tool to generate timing data relating to an estimated arrival time of the recipient;

the alternate data is communicated by the server to another software application as part of a response generated by the server in dependence upon the server establishing a reply generated by the recipient;

the software application is in execution upon the receiver device upon which the recipient generates the reply; and the another software application is in execution upon the sender device.

13. The method according to claim 1, wherein the predetermined sequence of buttons for each prompt associated with an expected reply comprises two or more keys.

14. The method according to claim 1, further comprising providing a software application in execution upon the receiver device upon which the recipient generates the reply which executes a process comprising the steps of:

capturing a voice recorded reply of the recipient;

analyzing the voice recorded reply for key words to establish an expected reply of the expected replies.

\* \* \* \* \*